US009001896B2

(12) United States Patent
Gordon

(10) Patent No.: US 9,001,896 B2
(45) Date of Patent: Apr. 7, 2015

(54) MULTISTANDARD VIDEO DECODER

(75) Inventor: Stephen Gordon, North Andover, MA (US)

(73) Assignee: Broadcom Corporation, Irvine, CA (US)

(*) Notice: Subject to any disclaimer, the term of this patent is extended or adjusted under 35 U.S.C. 154(b) by 886 days.

(21) Appl. No.: 12/560,231

(22) Filed: Sep. 15, 2009

(65) Prior Publication Data

US 2010/0008428 A1    Jan. 14, 2010

Related U.S. Application Data

(63) Continuation of application No. 11/000,731, filed on Dec. 1, 2004, now Pat. No. 7,590,059.

(60) Provisional application No. 60/573,357, filed on May 21, 2004.

(51) Int. Cl.
| | | |
|---|---|---|
| H04N 7/12 | (2006.01) | |
| H04N 21/44 | (2011.01) | |
| H04N 21/438 | (2011.01) | |
| H04N 19/44 | (2014.01) | |
| H04N 19/82 | (2014.01) | |
| H04N 19/42 | (2014.01) | |
| H04N 19/43 | (2014.01) | |
| H04N 19/70 | (2014.01) | |

(52) U.S. Cl.
CPC ..... *H04N 21/44008* (2013.01); *H04N 21/4382* (2013.01); *H04N 19/44* (2014.11); *H04N 19/82* (2014.11); *H04N 19/42* (2014.11); *H04N 19/43* (2014.11); *H04N 19/70* (2014.11)

(58) Field of Classification Search
USPC ........................................ 375/240.01–240.29
See application file for complete search history.

(56) References Cited

U.S. PATENT DOCUMENTS

| | | |
|---|---|---|
| 5,603,012 A | 2/1997 | Sotheran |
| 5,920,353 A | 7/1999 | Diaz et al. |
| 6,185,339 B1 | 2/2001 | Ozaki |

(Continued)

FOREIGN PATENT DOCUMENTS

EP    0 847 204 A    6/1998

OTHER PUBLICATIONS

European Search Report corresponding to European Patent Application No. 05010161.7-1247, dated Mar. 3, 2008, 3 pages.

*Primary Examiner* — Sath V Perungavoor
*Assistant Examiner* — Kehinde O Abimbola
(74) *Attorney, Agent, or Firm* — Brinks Gilson & Lione

(57) ABSTRACT

Methods and systems for processing video are disclosed. The method may include performing by one or more processors and/or circuits on a chip, receiving packetized data within an encoded video stream. An identifier may be determined within the received packetized data that defines one of a plurality of encoding types associated with packets in the encoded video stream. A decoding process may be selected from a plurality of decoding processes based on the determined identifier. The plurality of decoding processes may include a fixed length coding (FLC) process, a variable length coding (VLC) process and/or a context adaptive binary arithmetic coding (CABAC) process. At least a portion of the received packetized data in the encoded video stream may be decoded on the chip, utilizing the selected decoding process. A start code may be determined within the received packetized data that separates packets within the encoded video stream.

60 Claims, 12 Drawing Sheets

(56) References Cited

U.S. PATENT DOCUMENTS

| | | | |
|---|---|---|---|
| 6,192,080 B1 * | 2/2001 | Sun et al. | 375/240.16 |
| 6,198,768 B1 * | 3/2001 | Yamaguchi et al. | 375/240.01 |
| 6,215,823 B1 * | 4/2001 | Kim et al. | 375/240.16 |
| 6,263,023 B1 * | 7/2001 | Ngai | 375/240.12 |
| 6,278,735 B1 * | 8/2001 | Mohsenian | 375/240 |
| 6,438,317 B1 * | 8/2002 | Imahashi et al. | 386/239 |
| 6,459,812 B2 * | 10/2002 | Suzuki et al. | 382/232 |
| 6,539,059 B1 | 3/2003 | Siram et al. | |
| 6,587,508 B1 * | 7/2003 | Hanamura et al. | 375/240.24 |
| 6,611,624 B1 * | 8/2003 | Zhang et al. | 382/232 |
| 6,671,323 B1 * | 12/2003 | Tahara et al. | 375/240.26 |
| 6,704,361 B2 * | 3/2004 | Bublil et al. | 375/240.23 |
| 6,775,327 B2 * | 8/2004 | Ngai | 375/240.25 |
| 6,801,668 B2 * | 10/2004 | Frojdh et al. | 382/246 |
| 6,859,496 B1 * | 2/2005 | Boroczky et al. | 375/240.26 |
| 6,891,854 B2 * | 5/2005 | Zhang et al. | 370/468 |
| 6,894,628 B2 | 5/2005 | Marpe et al. | |
| 6,895,052 B2 * | 5/2005 | Hanamura et al. | 375/240.03 |
| 6,901,109 B2 * | 5/2005 | Hanamura et al. | 375/240.03 |
| 6,907,079 B2 | 6/2005 | Gomila et al. | |
| 6,934,338 B1 * | 8/2005 | Bublil et al. | 375/240.23 |
| 6,956,901 B2 * | 10/2005 | Boroczky et al. | 375/240.03 |
| 7,016,337 B1 * | 3/2006 | Wu et al. | 370/352 |
| 7,085,322 B2 * | 8/2006 | Ngai et al. | 375/240.25 |
| 7,162,093 B2 | 1/2007 | Regunathan et al. | |
| 7,248,740 B2 | 7/2007 | Sullivan | |
| 7,369,709 B2 * | 5/2008 | Hsu et al. | 382/248 |
| 7,412,001 B2 * | 8/2008 | Dufour et al. | 375/240.08 |
| 7,474,701 B2 * | 1/2009 | Boice et al. | 375/240.26 |
| 7,505,480 B1 * | 3/2009 | Zhang et al. | 370/465 |
| 7,505,518 B2 * | 3/2009 | Kadono et al. | 375/240.25 |
| 7,512,181 B2 * | 3/2009 | Boice et al. | 375/240.26 |
| 7,522,774 B2 * | 4/2009 | Ramasastry et al. | 382/232 |
| 7,590,059 B2 * | 9/2009 | Gordon | 370/230 |
| 7,593,433 B1 * | 9/2009 | Wu et al. | 370/537 |
| 7,653,129 B2 * | 1/2010 | He et al. | 375/240.03 |
| 7,653,136 B2 * | 1/2010 | Lobo et al. | 375/240.27 |
| 7,711,938 B2 * | 5/2010 | Wise et al. | 712/300 |
| 7,864,839 B2 * | 1/2011 | Zhang et al. | 375/240.03 |
| 7,894,530 B2 * | 2/2011 | Gordon et al. | 375/240.18 |
| 7,920,628 B2 * | 4/2011 | Kojokaro et al. | 375/240.16 |
| 7,970,058 B2 * | 6/2011 | Suzuki | 375/240.16 |
| 8,018,996 B2 * | 9/2011 | Chiba | 375/240.02 |
| 8,077,772 B2 * | 12/2011 | Mauchly et al. | 375/240.01 |
| 8,090,025 B2 * | 1/2012 | Sakazume | 375/240.16 |
| 8,106,804 B2 * | 1/2012 | Sadowski et al. | 341/155 |
| 8,150,172 B2 * | 4/2012 | Subramania et al. | 382/232 |
| 8,160,135 B2 * | 4/2012 | Yagasaki et al. | 375/240.01 |
| 8,170,100 B2 * | 5/2012 | Yagasaki et al. | 375/240.01 |
| 8,175,164 B2 * | 5/2012 | Kim et al. | 375/240.18 |
| 8,189,658 B2 * | 5/2012 | Yagasaki et al. | 375/240.01 |
| 2002/0094025 A1 * | 7/2002 | Hanamura et al. | 375/240.01 |
| 2003/0079117 A1 * | 4/2003 | Wise et al. | 712/300 |
| 2003/0156652 A1 | 8/2003 | Wise et al. | |
| 2003/0169816 A1 * | 9/2003 | Wang et al. | 375/240.12 |
| 2003/0206583 A1 * | 11/2003 | Srinivasan et al. | 375/240.01 |
| 2004/0028129 A1 * | 2/2004 | Nagumo et al. | 375/240.08 |
| 2004/0042474 A1 * | 3/2004 | Walker et al. | 370/412 |
| 2004/0179601 A1 * | 9/2004 | Kobayashi et al. | 375/240.12 |
| 2005/0031030 A1 * | 2/2005 | Kadono et al. | 375/240.01 |
| 2005/0058206 A1 * | 3/2005 | Lim et al. | 375/240.25 |
| 2005/0100086 A1 * | 5/2005 | Dufour et al. | 375/240.01 |
| 2005/0259688 A1 * | 11/2005 | Gordon | 370/477 |
| 2006/0062292 A1 * | 3/2006 | Boice et al. | 375/240.01 |
| 2007/0217500 A1 * | 9/2007 | Gao et al. | 375/240.01 |
| 2008/0260021 A1 * | 10/2008 | Sung | 375/240.01 |
| 2008/0273810 A1 * | 11/2008 | Subramania et al. | 382/251 |
| 2009/0174811 A1 * | 7/2009 | Sung et al. | 348/396.1 |
| 2009/0175334 A1 * | 7/2009 | Ye et al. | 375/240.12 |
| 2009/0175349 A1 * | 7/2009 | Ye et al. | 375/240.23 |
| 2009/0257503 A1 * | 10/2009 | Ye et al. | 375/240.17 |
| 2009/0279599 A1 * | 11/2009 | Pasquier et al. | 375/240.01 |
| 2010/0008428 A1 * | 1/2010 | Gordon | 375/240.23 |
| 2010/0040136 A1 * | 2/2010 | Sabo | 375/240.02 |
| 2010/0278272 A1 * | 11/2010 | Gordon | 375/240.23 |

\* cited by examiner

MULTISTANDARD VIDEO DECODER

RELATED APPLICATIONS

This application makes reference to, claims priority to, and claims the benefit of U.S. patent application Ser. No. 11/000, 731, filed on Dec. 1, 2004, which claims priority to, and claims the benefit of U.S. Provisional Patent Application 60/573,357, filed on May 21, 2004 and entitled "Multistandard Video Decoder," the complete subject matter of which is hereby incorporated herein by reference in its entirety.

This application is related to the following applications, each of which is incorporated herein by reference in its entirety for all purposes:

U.S. patent application Ser. No. 10/963,677 filed Oct. 13, 2004;
U.S. patent application Ser. No. 10/985,501 filed Nov. 10, 2004;
U.S. patent application Ser. No. 11/112,632 filed Apr. 22, 20054;
U.S. patent application Ser. No. 10/985,110 filed Nov. 10, 2004;
U.S. patent application Ser. No. 10/981,218 filed Nov. 4, 2004;
U.S. patent application Ser. No. 10/965,172 filed Oct. 13, 2004;
U.S. patent application Ser. No. 10/972,931 filed Oct. 25, 2004;
U.S. patent application Ser. No. 10/974,179 filed Oct. 27, 2004;
U.S. patent application Ser. No. 10/974,872 filed Oct. 27, 2004;
U.S. patent application Ser. No. 10/970,923 filed Oct. 21, 2004;
U.S. patent application Ser. No. 10/963,680 filed Oct. 13, 2004;
U.S. patent application Ser. No. 11/013,768 filed Dec. 16, 2004;
U.S. patent application Ser. No. 11/102,389 filed Apr. 8, 2005;
U.S. patent application Ser. No. 11/135,929 filed May 23, 2005; and
U.S. patent application Ser. No. 11/000,676 filed Dec. 1, 2004.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

During encoding of a video signal, one or more encoding techniques, such as H.261, H.263, H.263+ (Annex J), H.264, SMPTE VC-1, MPEG-1, MPEG-2 and/or MPEG-4, may be utilized to encode the video signal on a macroblock-by-macroblock basis. During encoding of video information, for example, prediction error information may be encoded together with prediction mode information, as well as with other side information necessary for the decoding process. In order to encode the prediction error information, a discrete cosine transformation may be applied to transform the prediction error information into frequency domain coefficients prior to quantization and entropy encoding. During this process, certain information relating to the prediction error, for example, may be lost. As a result of the missing information, the quality of the decoded video signal may be decreased. More specifically, transform blockiness may appear in the decoded video in the form of square grid artifacts, for example. Other artifacts may also appear in the decoded video due to missing video information.

Conventional video decoders are adapted to decode elementary video stream encoded according to a single encoding standard, such as H.264, VC-1, MPEG-1, MPEG-2 and/or MPEG-4 encoding standards. An elementary video stream may be encoded utilizing a single encoding technique. However, an application space may support a stream being encoded using any one of many standards. For example, the Blu-Ray ROM specification for high definition DVD playback allows a video stream to be encoded using MPEG-2, H.264, or VC-1.

However, decoding efficiency in conventional video processing systems is substantially decreased since two or more decoders may need to be utilized for processing/decoding of elementary video streams that may have been encoded according to different encoding standards.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Certain embodiments of the invention may be found in a method and system for processing an encoded video stream. Aspects of the method may comprise receiving on a chip, packetized data within the encoded video stream. An identifier within the received packetized data may be determined on the chip, where the identifier may define one of a plurality of encoding types associated with packets in the encoded video stream. A decoding process may be selected on the chip from a plurality of decoding processes, based on the determined identifier. A portion of the received packetized data in the encoded video stream may be decoded on the chip utilizing the selected decoding process. A delimiter may be determined within the received packetized data that separates packets within the encoded video stream. A plurality of bytes within the received packetized data may be matched with a determined byte sequence. If the plurality of bytes matches the determined byte sequence, the plurality of bytes may be removed from the received packetized data.

If the determined identifier corresponds to H.264 video encoding, the received packetized data may be decoded utilizing a fixed length coding (FLC) process, a variable length coding (VLC) process and/or a context adaptive binary arithmetic coding (CABAC) process. If the determined identifier corresponds to VC-1, H.261, H.263, H.263+, MPEG-1, MPEG-2 and/or MPEG-4 video encoding, the received packetized data may be decoded utilizing a FLC process and/or a VLC process. The decoded packetized data may comprise decoding process control information and/or prediction error information. A decoded video stream may be generated utilizing the decoded packetized data. The generated decoded video stream may be filtered utilizing an overlapped transform process and/or a deblocking process. For each of the plurality of decoding processes, a portion of the received packetized data may be decoded on the chip utilizing inverse transformation, inverse quantization, and/or motion compensation.

Another embodiment of the invention may provide a machine-readable storage, having stored thereon, a computer program having at least one code section executable by a machine, thereby causing the machine to perform the steps as described above for processing an encoded video stream.

Aspects of the system may comprise at least one processor that receives on a chip, packetized data within the encoded video stream on a chip. The processor may determine on the chip an identifier within the received packetized data that defines one of a plurality of encoding types associated with packets in the encoded video stream. A decoding process may be selected by the processor from a plurality of decoding processes based on the determined identifier. A portion of the received packetized data in the encoded video stream may be decoded by the processor utilizing the selected decoding process. A delimiter within the received packetized data that separates packets within the encoded video stream may be determined by the processor. The processor may match a plurality of bytes within the received packetized data with a determined byte sequence and if the plurality of bytes matches the determined byte sequence, the plurality of bytes may be removed by the processor from the received packetized data.

If the determined identifier corresponds to H.264 video encoding, the received packetized data may be decoded by the processor utilizing a fixed length coding (FLC) process, a variable length coding (VLC) process and/or a context adaptive binary arithmetic coding (CABAC) process. If the determined identifier corresponds to VC-1, H.261, H.263, H.263+, MPEG-1, MPEG-2 and/or MPEG-4 video encoding, the received packetized data may be decoded by the processor utilizing a FLC process and/or a VLC process. The decoded packetized data may comprise decoding process control and/or prediction error information. A decoded video stream may be generated by the processor utilizing the decoded packetized data. The processor may filter the generated decoded video stream utilizing an overlapped transform process and/or a deblocking process.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain aspects of the invention may be found in a method and system for processing an encoded video stream. During encoding of a video stream, different encoding standards may be utilized to encode data within elementary video streams. In one aspect of the invention, a multistandard video decoder may be adapted to acquire an elementary video stream encoded according to an encoding standards, such as H.261, H.263, H.263+ (Annex J), H.264, VC-1, MPEG-1, MPEG-2 and/or MPEG-4, for example. The multistandard decoder may locate one or more delimiters within the elementary video stream, where the delimiters may separate packetized data within encapsulated video payloads. Each delimiter may comprise a start code information signaling the beginning of a video payload and an encoding type information.

The encoding type information may be associated with a method of encoding utilized by an encoder to encode a corresponding video payload. The multistandard decoder may also destuff, or remove, one or more bytes from the encapsulated video payload, where such bytes were inserted by an encoder to avoid false start codes from being present in the video payload. Depending on the encoding type information, the encapsulated video payload may be decoded on-chip utilizing corresponding decoding modules. For example, temporal or spatial prediction pixels may be generated from decoding process control information in the encapsulated video payload. In addition, prediction errors may also be generated from quantized frequency coefficients within the encoded video payload. A decoded video stream may then be reconstructed utilizing temporal and/or spatial prediction pixels and prediction error information. In one aspect of the invention, the multistandard decoder may utilize a single central processing unit (CPU) to process header information and macroblock information within the packets in the encoded bitstream. In another aspect of the invention, a CPU pair may be utilized, where a first CPU may process future header information while a second CPU may process current macroblock information.

Figure 1:
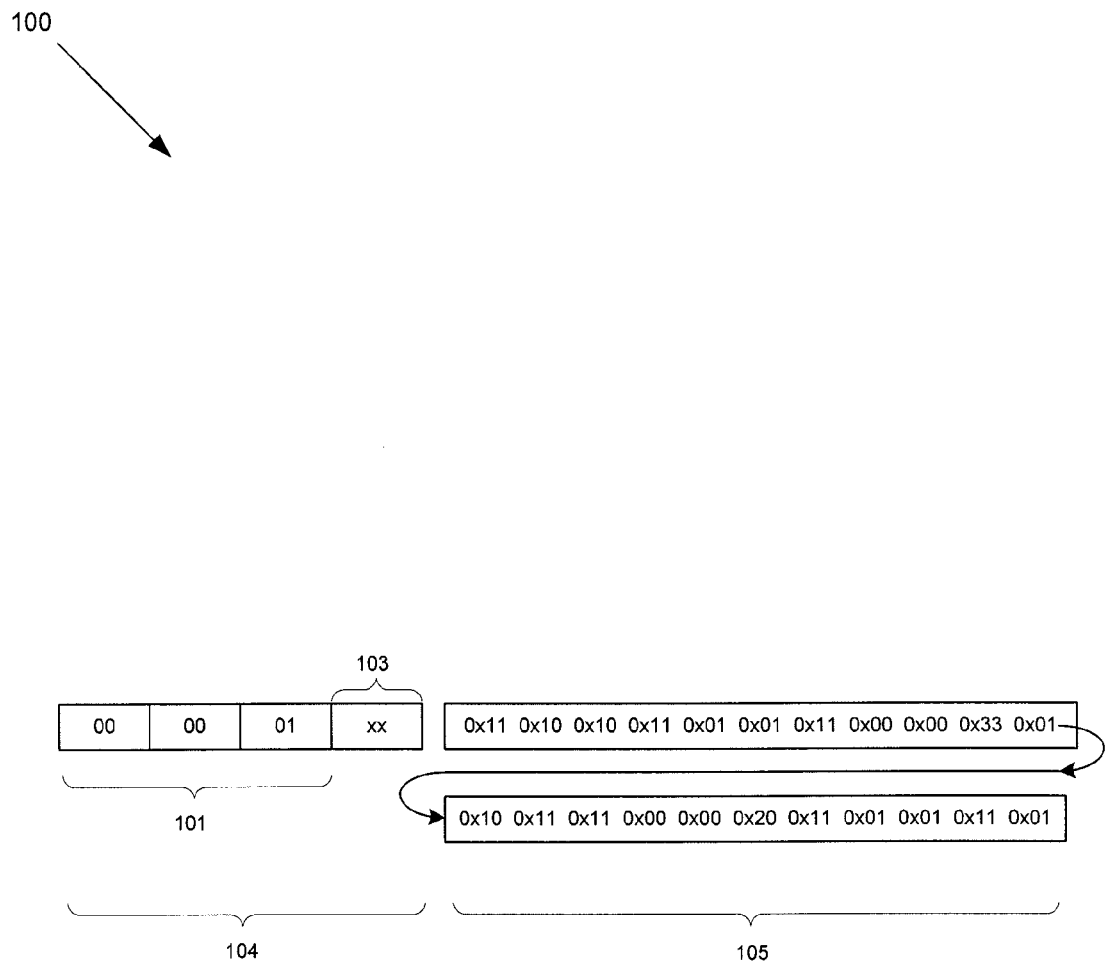
FIG. 1 is a block diagram of an encapsulated video payload with a delimiter, in accordance with an embodiment of the invention.

FIG. 1 is a block diagram of an encapsulated video payload 100 with a delimiter, in accordance with an embodiment of the invention. Referring to FIG. 1, the encapsulated video payload 100 may comprise a delimiter 104 and elementary video stream data 105. The delimiter 104 may comprise a start code 101 and a start code suffix 103 and may be utilized by a decoder, for example, to locate a starting bit for the encapsulated video payload 100 as well as a starting bit for the elementary video stream data 105. In addition, the delimiter 104 may comprise information relating to the method of encoding utilized to encode the elementary video stream data 105. The elementary video stream data may comprise a plurality of bytes, where each byte may comprise two nibbles.

The start code 101 may comprise a plurality of bytes that may be arranged in a unique combination to signify the beginning of the encapsulated video payload 100 within an encoded video stream. For example, the start code 101 may comprise an exemplary byte sequence "00 00 01." The start code suffix 103 may comprise one or more bytes located after the start code 101 within the encapsulated video payload 100. In one aspect of the invention, the start code suffix 103 may correspond to an encoding method utilized to encode the elementary video stream data 105 within the encapsulated video payload 100. For example, the start code suffix 103 may correspond to H.264, VC-1, MPEG-1, MPEG-2 and/or MPEG-4 as the encoding method utilized to encode the elementary video stream data 105. The start code 101 and the start code suffix 103 may be generated by the encoder prior to communicating the encoded video stream data to a video decoder.

Figure 2:
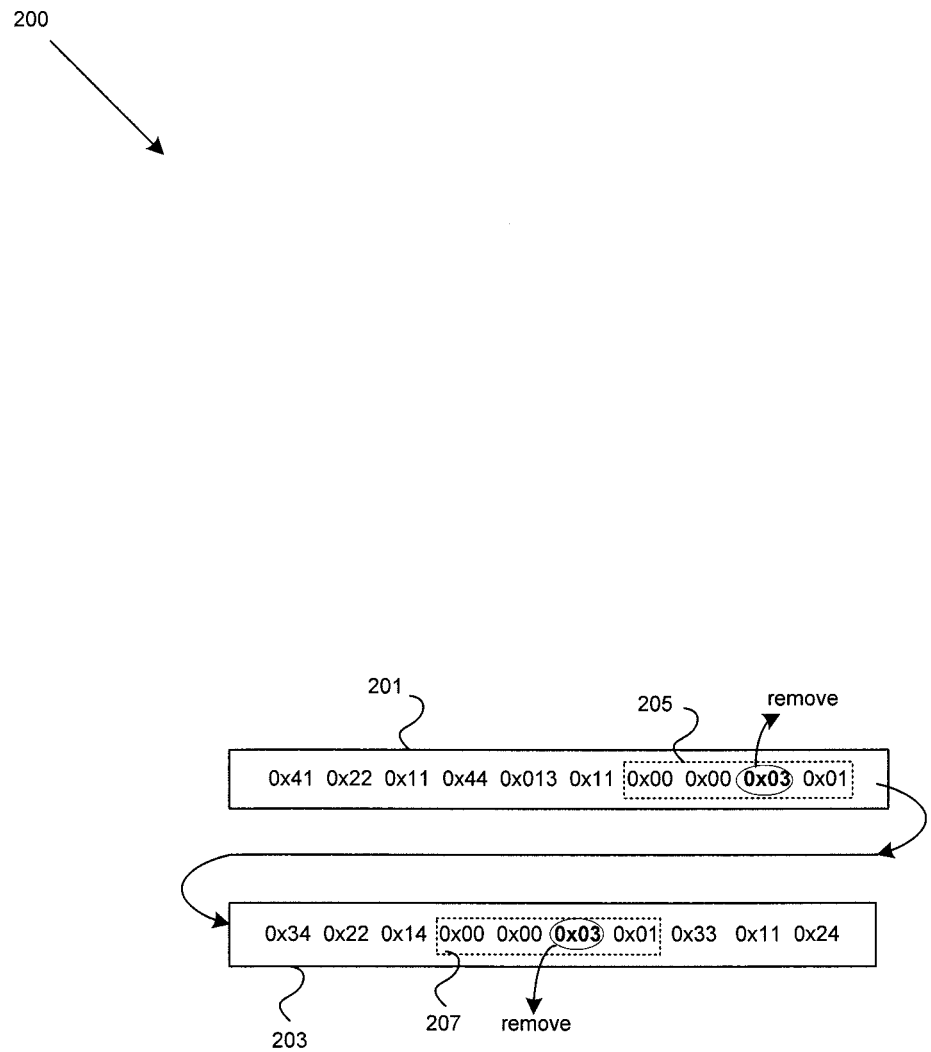
FIG. 2 is a block diagram illustrating byte destuffing within elementary video stream data, in accordance with an embodiment of the invention.

FIG. 2 is a block diagram illustrating byte destuffing within elementary video stream data 200, in accordance with an embodiment of the invention. Referring to FIG. 2, the elementary video stream data 200 may comprise elementary video data sequences 201 and 203. The elementary video stream data 200 may be preceded by a delimiter comprising a start code sequence and a start code suffix, as illustrated on FIG. 1. During video signal encoding and after an encoder has generated a delimiter for the elementary video stream data 200, the encoder may insert one or more bytes in the elementary video stream data 200 so that a corresponding start code sequence may not be recognized by a decoder within the elementary video stream data 200 during decoding.

For example, during encoding of the elementary video stream data 200, an encoder may utilize a start code comprising the byte sequence "00 00 01." During decoding of the elementary video stream 200, a decoder may incorrectly identify the start code sequence "00 00 01" within the elementary stream 200. In order to avoid any such mis-identification of a start code sequence, an encoder may insert one or more extra characters/symbols, or a stuffing byte, so that a start code sequence may not be mis-identified within the elementary video stream 200 during decoding. For example, an extra character string, or a stuffing byte, "03" may be inserted within the byte sequence 205 within the elementary video data sequence 201. Similarly, the stuffing byte "03" may also be inserted within the byte sequence 207 within the elementary video data sequence 203. In this manner, the decoder may be prevented from recognizing the start code sequence "00 00 01" during decoding of the elementary video stream 200.

During decoding of the elementary video stream 200, a video decoder may destuff or remove, any extra characters inserted in the elementary video stream 200 during encoding. Accordingly, the extra character string "03" may be removed from the byte sequence 205 within the elementary video data sequence 201, and the extra character "2" may be removed from the byte sequence 207 within the elementary video data sequence 207. In this manner, a raw video payload may be generated after removing any extra characters within the elementary video stream 200. The resulting raw video payload may then be decoded by a symbol interpreter, for example.

Figure 3A:
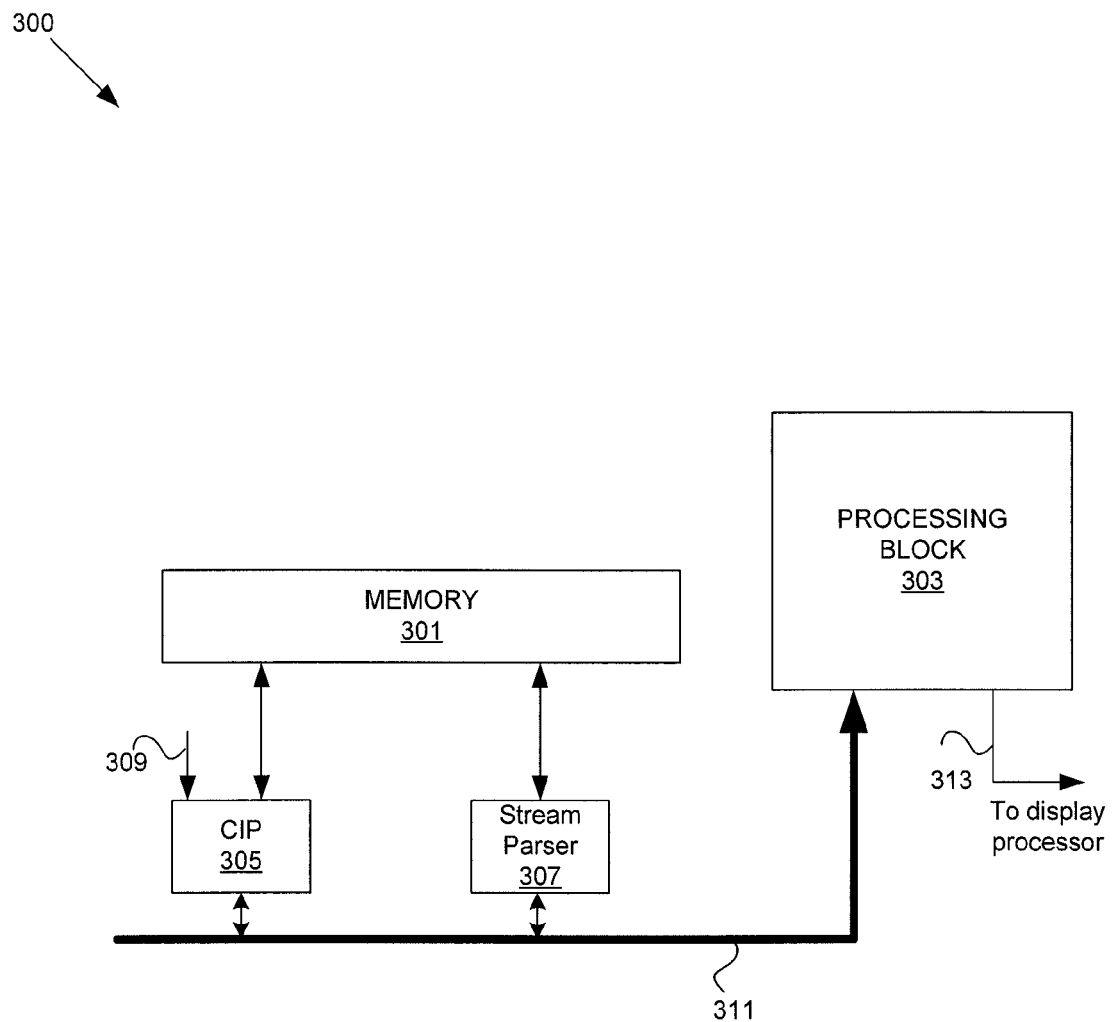
FIG. 3A is a high level block diagram illustrating a multistandard video decoder, in accordance with an embodiment of the invention.

FIG. 3A is a high level block diagram illustrating a multi-standard video decoder, in accordance with an embodiment of the invention. Referring to FIG. 3A, the multistandard video decoder 300 may comprise a memory block 301, a code-in-port (CIP) 305, a stream parser 307, and a processing block 303. The CIP 305 comprises suitable circuitry, logic and/or code and may be adapted to acquire an elementary video stream 309. The CIP 305 may also be adapted to locate start codes and start code suffixes within the elementary video stream 309 and to destuff extra bytes from the elementary video stream 309, thus generating raw elementary video stream.

The multistandard video decoder 300 may utilize the stream parser 307 to process start code information and raw stream information that may be acquired from the CIP 305. For example, the stream parser 307 may be adapted to process header information and/or macroblock information from the raw elementary bitstream generated by the CIP 305. Header information from the raw elementary bitstream may comprise slice information, picture information, GOP/entry point information, and/or sequence information, for example. Slice packets within the raw elementary video stream generated by the CIP 305 may comprise slice header information and macroblock information corresponding to the particular slice. In addition, the stream parser 307 may be adapted to process header and/or macroblock information in the raw elementary stream acquired from the CIP 305, and generate quantized frequency coefficients information and/or additional side information, for example, necessary for decoding of macroblock information in the raw elementary video stream.

The stream parser 307 may comprise one or more decoder assist blocks specific to each mode of encoding that may be utilized to decode the raw elementary stream. The output signal from the stream parser 307 may be communicated to the processing block 303 via the bus 311. The bus 311 may be implemented within the multistandard video decoder 300 as a one-way bus communicating information to the processing block 303 to increase processing efficiency and simplicity of implementation. Temporary information generated during decoding of the raw elementary video stream may be stored by the stream parser 307 and/or by the CIP 305 in the memory module 301. The memory module 301 may comprise DRAM, for example.

In an exemplary aspect of the invention, the stream parser 307 may be implemented utilizing a single CPU and a single corresponding symbol interpreter (SI). The single CPU/SI configuration may be utilized to process the entire video elementary stream, including start codes/suffixes, header information, and/or macroblock information. In another aspect of the invention, the stream parser 307 may be implemented utilizing two separate CPUs and symbol interpreters for increased processing efficiency. For example, in the exemplary dual-CPU/SI configuration, a first CPU and a first SI may be utilized to process header information within the elementary video stream, and a second CPU with a corresponding second SI may be utilized to process macroblock information from the elementary bitstream. In this regard, subsequent header information may be processed by the first CPU and the first SI, while the second CPU and the second SI may simultaneously process current macroblock information.

The processing block 303 may utilize the processing information generated by the stream parser 307 to generate a decoded video stream 313. The processing block 303 comprises suitable circuitry, logic and/or code and may be adapted to perform one or more of the following processing tasks: spatial prediction, motion compensation, inverse quantization and transformation, macroblock reconstruction, in-loop macroblock filtering, and/or macroblock post processing. Each of the processing tasks within the processing block 303 may utilize one or more assist blocks corresponding to a specific encoding method that may have been utilized to encode the elementary video stream 309. In this regard, the processing block 303 may be adapted to decode an elementary video stream that may have been encoded utilizing one of a plurality of encoding methods, such as H.261, H.263, H.263+ (Annex J), H.264, VC-1, MPEG-1, MPEG-2 and/or MPEG-4, for example.

Figure 3B:
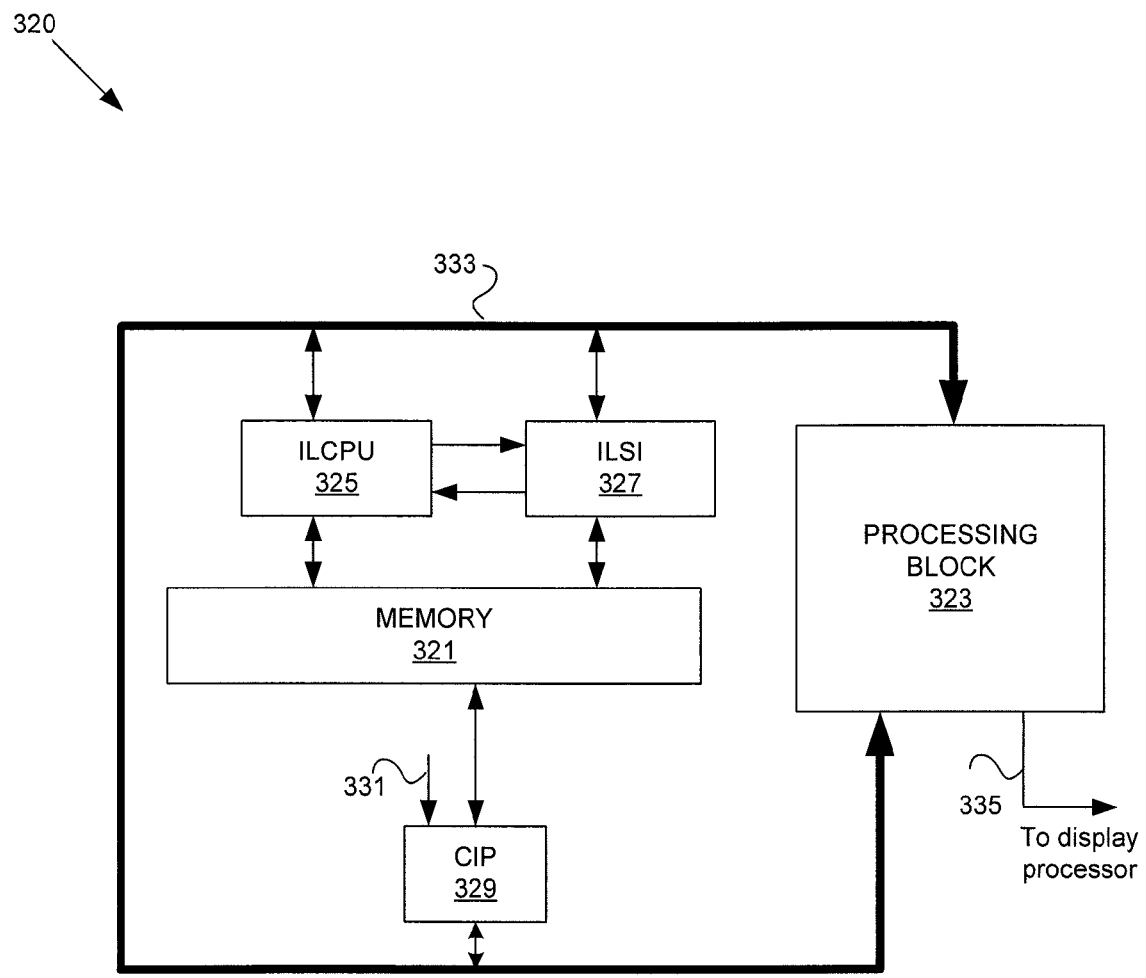
FIG. 3B is a high level block diagram illustrating a multistandard video decoder utilizing a single CPU, in accordance with an embodiment of the invention.

FIG. 3B is a high level block diagram illustrating a multistandard video decoder 320 utilizing a single CPU, in accordance with an embodiment of the invention. Referring to FIG. 3B, the multistandard video decoder 320 may comprise a memory block 321, a code-in-port (CIP) 329, an inner loop central processing unit (ILCPU) 325, an inner loop symbol interpreter (ILSI) 327, and a processing block 323. The CIP 329 comprises suitable circuitry, logic and/or code and may be adapted to acquire an elementary video stream 331. The CIP 329 may also be adapted to locate start codes and/or start code suffixes within the elementary video stream 331 and to destuff extra bytes from the elementary video stream 331, thus generating raw elementary video stream.

In an exemplary embodiment of the invention, the multistandard video decoder 320 may utilize the ILCPU 325 and the ILSI 327 to process header information and/or macroblock information from the raw elementary bitstream generated by the CIP 329. Header information from the raw elementary bitstream may comprise slice information, picture information, GOP/entry point information, and/or sequence information, for example. Slice packets within the raw elementary video stream generated by the CIP 329 may comprise slice header information and/or macroblock information corresponding to the particular slice.

The ILSI 327 comprises suitable circuitry, logic and/or code and may be adapted to process header and/or macroblock information in the raw elementary stream acquired from the CIP 329, and generate quantized frequency coefficients information and/or additional side information, for example, necessary for decoding of macroblock information in the raw elementary video stream. The ILSI 327 may comprise one or more decoder assist blocks specific to each mode of encoding that may be utilized to decode the raw elementary stream.

The ILCPU 325 may be adapted to sequence the ILSI 327 by, for example, providing decoding instructions to the ILSI 327 via the bus 333. The bus 333 may be implemented within the multistandard video decoder 320 as a one-way bus communicating information to the processing block 323 to increase processing efficiency and simplicity of implementation. Temporary information generated during decoding of the raw elementary video stream may be stored by the ILCPU 325, the CIP 329, and/or the ILSI 327 in the memory module 321. The memory module 321 may comprise DRAM, for example.

In operation, the incoming elementary video stream 331 may comprise video data encoded according to one of a plurality of encoding standards, such as H.261, H.263, H.263+ (Annex J), H.264, VC-1, MPEG-1, MPEG-2, and/or MPEG-4, for example. The CIP 329 may be adapted to detect one or more start codes and start code suffixes, which may correspond to the mode of encoding of the elementary video stream 331. The CIP 329 may also be adapted to generate a raw elementary video stream comprising header and/or macroblock information. The start codes and the raw elementary stream may be communicated, via the memory 321, to the ILCPU 325 and the ILSI 327 for further processing. The ILSI 327, utilizing instructions from the ILCPU 325, may be adapted to process the header and/or macroblock information communicated by the CIP 329. The ILSI 327 may then generate an output signal that may comprise acquired macroblock type information, slice type information, prediction mode information, motion vector information, and/or quantized frequency coefficients, for example. The output signal may be communicated via the bus 333 to the processing block 323 for use during macroblock decoding.

The processing block 323 may utilize the processing information generated by the ILSI 327 to generate a decoded video stream 335. The processing block 323 comprises suitable circuitry, logic and/or code and may be adapted to perform one or more of the following processing tasks: spatial prediction, motion compensation, inverse quantization and transformation, macroblock reconstruction, in-loop macroblock filtering, and/or macroblock post processing. Each of the processing tasks within the processing block 323 may utilize one or more assist blocks corresponding to a specific encoding method that may have been utilized to encode the elementary video stream 331. In this regard, the processing block 323 may be adapted to decode an elementary video stream that may have been encoded utilizing one of a plurality of encoding methods, such as H.261, H.263, H.263+ (Annex J), H.264, VC-1, MPEG-1, MPEG-2, and/or MPEG-4, for example.

Figure 3C:
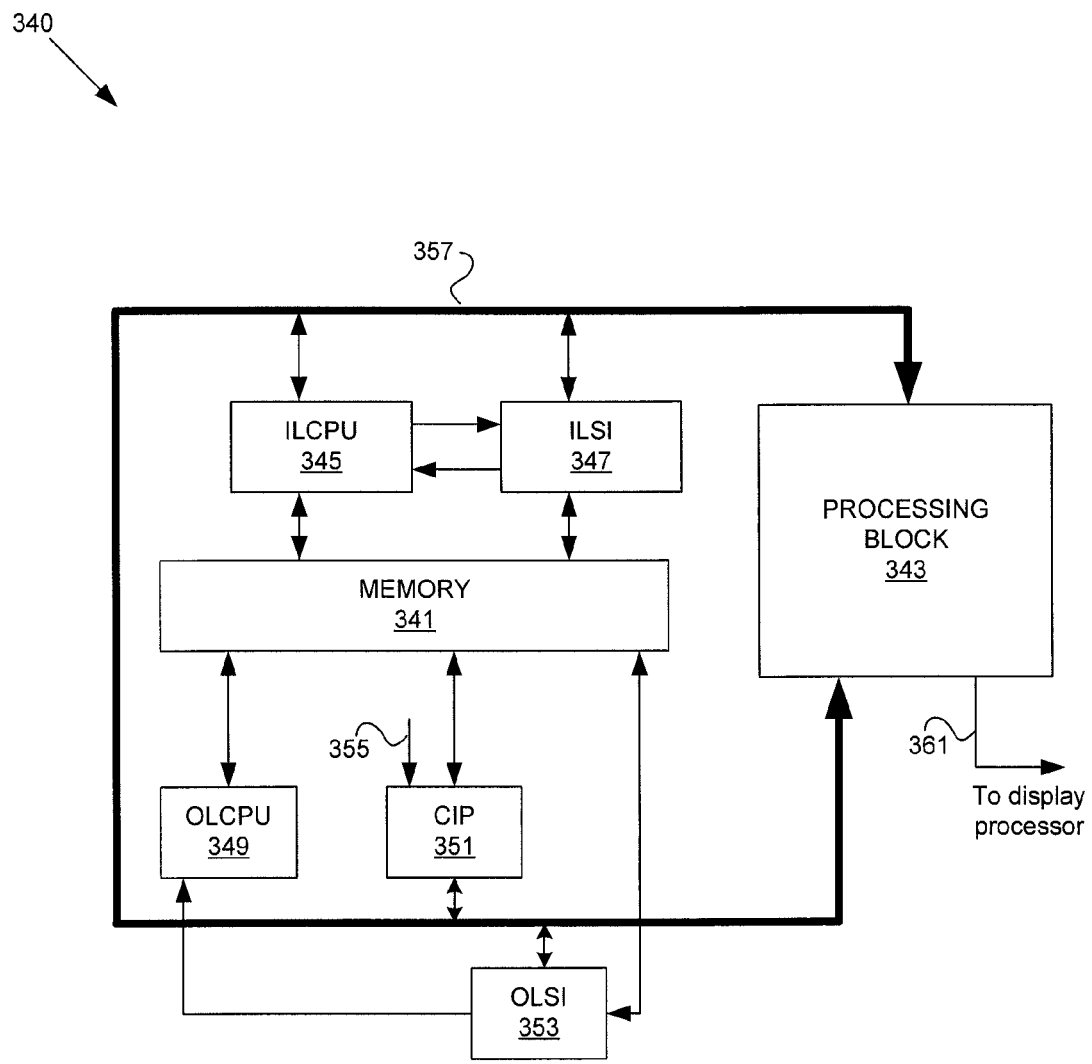
FIG. 3C is a high level block diagram illustrating a multistandard video decoder utilizing a CPU pair, in accordance with an embodiment of the invention.

FIG. 3C is a high level block diagram illustrating a multistandard video decoder 340 utilizing a CPU pair, in accordance with an embodiment of the invention. Referring to FIG. 3C, the multistandard video decoder 340 may comprise a memory block 341, an outer loop central processing unit (OLCPU) 349, a code-in-port (CIP) 351, an outer loop symbol interpreter (OLSI) 353, an inner loop central processing unit (ILCPU) 345, an inner loop symbol interpreter (ILSI) 347, and a processing block 343. The CIP 351 comprises suitable circuitry, logic and/or code and may be adapted to acquire an elementary video stream 355. The CIP 351 may also be adapted to locate start codes and start code suffixes within the elementary video stream 355 and to destuff extra bytes from the elementary video stream 355, thus generating raw elementary video stream.

In an exemplary embodiment of the invention, the multistandard video decoder 340 may utilize a CPU pair, such as ILCPU 345 and OLCPU 349, with corresponding ILSI 347 and OLSI 353, to separately process header information and macroblock information from the raw elementary bitstream generated by the CIP 351. Header information from the raw elementary bitstream may comprise slice information, picture information, GOP/entry point information, and/or sequence information, for example. Slice packets within the raw elementary video stream generated by the CIP 351 may comprise slice header information and macroblock information corresponding to the particular slice. For example, the OLCPU 349 and the OLSI 353 may be adapted to process header information from the raw elementary bitstream generated by the CIP 351. In addition, the ILCPU 345 and the ILSI 347 may be adapted to process macroblock information from the raw elementary bitstream generated by the CIP 351. In this manner, parallel processing may be achieved within the multistandard video decoder 340 as the OLCPU 349 and the OLSI 353 may process future header information, while the ILCPU 345 and the ILSI 347 may process current macroblock information.

The ILSI 347 comprises suitable circuitry, logic and/or code and may be adapted to process macroblock information in the raw elementary stream acquired from the CIP 351, and generate quantized frequency coefficients information and/or additional side information, for example, necessary for decoding of macroblock information in the raw elementary video stream. The ILSI 347 may comprise one or more decoder assist blocks specific to each mode of encoding that may be utilized to decode the raw elementary stream. The OLSI 353 comprises suitable circuitry, logic and/or code and may be adapted to process header information in the raw elementary stream acquired from the CIP 351.

The ILCPU 345 may be adapted to sequence the ILSI 347 by, for example, providing decoding instructions to the ILSI 347 via the bus 357. The bus 357 may be implemented within the multistandard video decoder 340 as a one-way bus communicating information to the processing block 343 to increase processing efficiency and simplicity of implementation. Temporary information generated during decoding of the raw elementary video stream may be stored by the ILCPU 345, the OLCPU 349, the OLSI 353, the CIP 351, and/or the ILSI 347 in the memory module 341. The memory module 341 may comprise DRAM, for example.

In operation, the incoming elementary video stream 355 may comprise video data encoded according to one of a plurality of encoding standards, such as H.261, H.263, H.263+ (Annex J), H.264, VC-1, MPEG-1, MPEG-2, and/or MPEG-4, for example. The CIP 351 may be adapted to detect one or more start codes and start code suffixes, which may correspond to the mode of encoding of the elementary video stream 355. The CIP 351 may also be adapted to generate a raw elementary video stream comprising header and/or macroblock information. Header information within the raw elementary stream generated by the CIP 351 may be communicated to the OLCPU 349 and the OLSI 353 for further processing. The start codes and macroblock information within the raw elementary stream may be communicated, via the memory 341, to the ILCPU 345 and the ILSI 347 for further processing. In an exemplary aspect of the invention, the OLCPU 349 and the OLSI 353 may be adapted to process subsequent, or future, header information, while the ILCPU 345 and the ILSI 347 may process current macroblock information.

The ILSI 347, utilizing instructions from the ILCPU 345, may be adapted to process the macroblock information in the raw elementary stream communicated by the CIP 351. The ILSI 347 may then generate an output signal that may comprise acquired macroblock type information, slice type information, prediction mode information, motion vector information, and/or quantized frequency coefficients, for example. The output signal may be communicated via the bus 357 to the processing block 343 for use during macroblock decoding.

The processing block 343 may utilize the processing information generated by the ILSI 347 to generate a decoded video stream 361. The processing block 343 comprises suitable circuitry, logic and/or code and may be adapted to perform one or more of the following processing tasks: spatial prediction, motion compensation, inverse quantization and transformation, macroblock reconstruction, in-loop macroblock filtering, and/or macroblock post processing. Each of the processing tasks within the processing block 343 may utilize one or more assist blocks corresponding to a specific encoding method that may have been utilized to encode the elementary video stream 355. In this regard, the processing block 343 may be adapted to decode an elementary video stream that may have been encoded utilizing one of a plurality of encoding methods, such as H.261, H.263, H.263+ (Annex J), H.264, VC-1, MPEG-1, MPEG-2 and/or MPEG-4, for example.

Figure 4A:
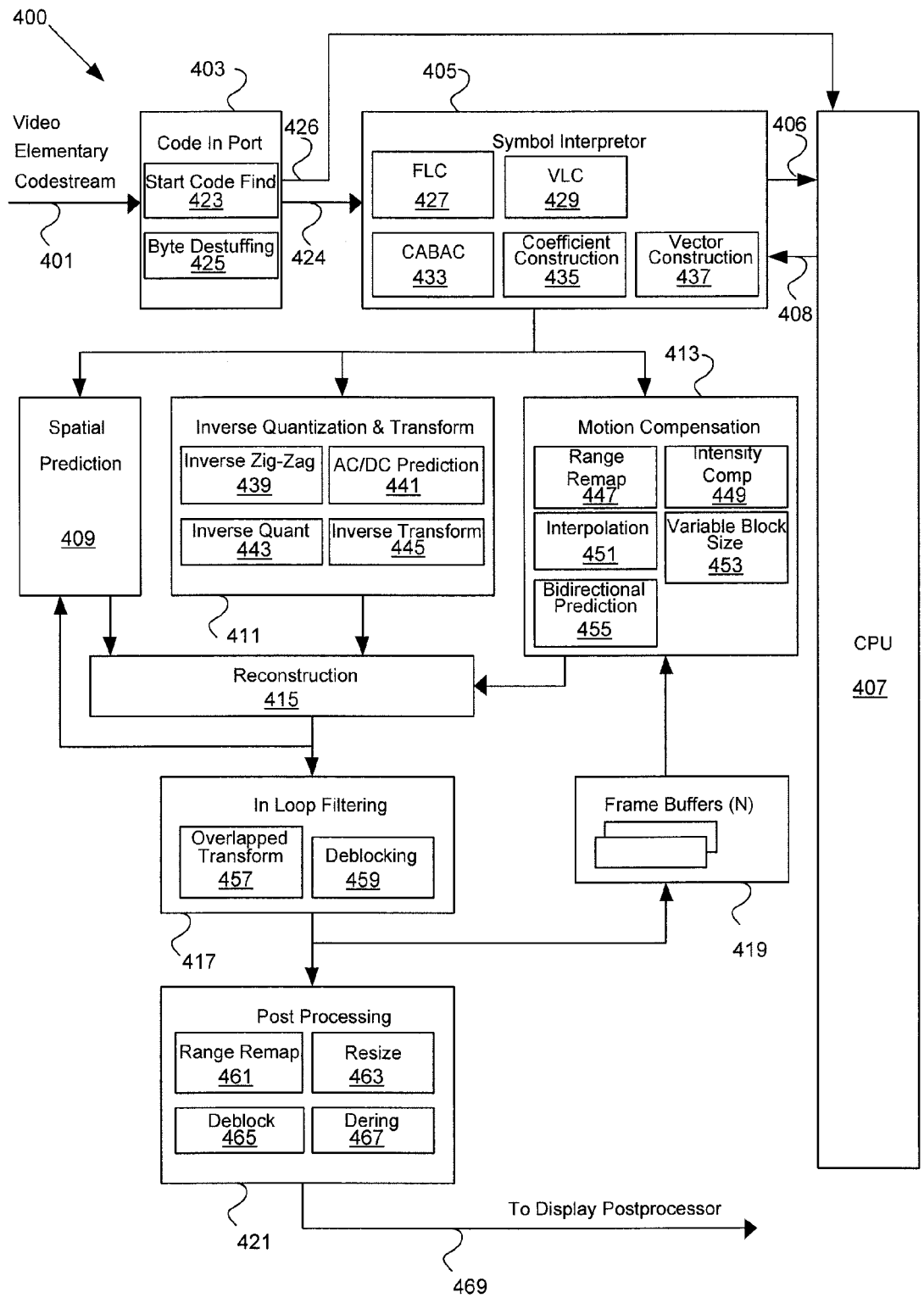
FIG. 4A is a block diagram illustrating a multistandard video decoder with hardware assist blocks and a single CPU, in accordance with an embodiment of the invention.

FIG. 4A is a block diagram illustrating a multistandard video decoder with hardware assist blocks and a single CPU, in accordance with an embodiment of the invention. Referring to FIG. 4A, the multistandard video decoder 400 may comprise a code-in-port (CIP) 403, a symbol interpreter 405, a central processing unit (CPU) 407, a spatial prediction block 409, an inverse quantization and transformation (IQT) block 411, a motion compensation block 413, a reconstructor 415, an in-loop filter 417, a frame buffer 419 and a post-processing block 421.

The CIP 403 comprises suitable circuitry, logic and/or code and may be adapted to receive video elementary code stream 401 and generate start codes, start code suffixes and raw elementary stream. The CIP 403 may comprise a start code finding block 423 and a byte destuffing block 425. The start code finding block 423 may be adapted to locate start codes and start code suffixes, as illustrated in FIG. 1. The byte destuffing block 425 may be adapted to destuff extra bytes from the video elementary codestream 401 and generate raw elementary stream data, as illustrated in FIG. 2. After the start codes, start code suffixes and raw elementary stream are generated within the CIP 403, the start code suffixes 426 may be communicated to the CPU 407 and the raw elementary stream may be communicated to the symbol interpreter 405 for further processing.

In an exemplary embodiment of the invention, the multistandard video decoder 400 may utilize the CPU 407 and the symbol interpreter 405 to process header information and/or macroblock information from the raw elementary bitstream generated by the CIP 403. Header information from the raw elementary bitstream may comprise slice information, picture information, GOP/entry point information, and/or sequence information, for example. Slice packets within the raw elementary video stream generated by the CIP 403 may comprise slice header information and macroblock information corresponding to the particular slice.

The symbol interpreter 405 comprises suitable circuitry, logic and/or code and may be adapted to interpret raw elementary stream 424 acquired from the CIP 403 to obtain quantized frequency coefficients information and/or additional side information necessary for decoding of the raw elementary video stream 424. The symbol interpreter 405 may also communicate to the CPU 407, video information on subsequent macroblock and/or frame within the raw elementary video stream 424 via the connection 406. After the CPU 407 acquires start code suffixes 426 from the CIP 403, the CPU 407 may generate one or more decoding instructions for the symbol interpreter 405 based on the encoding method associated with the acquired start code suffixes 426. The CPU 407 may be adapted to sequence the symbol interpreter 405 by providing such decoding instructions to the symbol interpreter 405 via the connection 408. The CPU 407 may also communicate decoding instructions to the symbol interpreter 405 based on received video information on a subsequent macroblock and/or frame via the connection 406.

In one aspect of the invention, the incoming elementary video stream 401 may comprise video data encoded according to one of a plurality of encoding standards, such as H.261, H.263, H.263+ (Annex J), H.264, VC-1, MPEG-1, MPEG-2 and/or MPEG-4, for example. The symbol interpreter 405, utilizing instructions from the CPU 407, may be adapted to decode one or more symbols and/or additional processing information, such as header and/or macroblock information, that may be utilized to complete decoding of the raw elementary stream 424 received from the CIP 403. The symbol interpreter 405 may comprise a plurality of decoder assist blocks specific to each mode of encoding that may be utilized to decode the raw elementary stream 424.

In an illustrative embodiment of the invention, the symbol interpreter 405 may comprise a fixed length coding (FLC) block 427, a variable length coding (VLC) block 429, a context adaptive binary arithmetic coding (CABAC) block 433, a coefficient construction block 435, and a vector construction block 437. The decoder assist blocks within the symbol interpreter 405 may be utilized during decoding depending on encoding method information that may be obtained from a start code suffix 426 generated by the CIP 403 and communicated to the CPU 407. The FLC block 427, the VLC block 429 and the CABAC block 433 may be utilized by the symbol interpreter 405 to decode/interpret single syntax elements from the raw elementary stream 424 that were encoded utilizing fixed length coding, variable length coding or CABAC coding techniques, respectively.

The coefficient construction block 435 may be adapted to generate one or more quantized frequency coefficients from the raw elementary stream 424. Quantized frequency coefficients generated by the coefficient construction block 435 may be subsequently utilized within the multistandard video decoder 400 to generate prediction error information utilized during reconstruction of one or more macroblocks. The generated quantized frequency coefficients may be communicated by the symbol interpreter 405 to the IQT block 411 for further processing.

Similarly, the vector construction block 437 may be adapted to generate one or more motion vectors from the raw elementary stream 424. The motion vectors generated by the vector construction block 437 may be utilized within the multistandard video decoder 400 to generate prediction pixels utilized during reconstruction of one or more macroblocks. The generated motion vector information may be communicated by the symbol interpreter 405 to the motion compensation block 413 for further processing.

The spatial prediction block 409 comprises suitable circuitry, logic and/or code and may be adapted to generate prediction pixels used by the reconstruction block 415 to generate a decoded macroblock. The spatial prediction block 409 may be adapted to acquire macroblock type information, slice type information and/or prediction mode information, for example, from the symbol interpreter 405. The spatial prediction block 409 may then utilize the acquired macroblock type information, slice type information and/or prediction mode information to generate prediction pixels for spatially predicted macroblocks.

The motion compensation block 413 comprises suitable circuitry, logic and/or code and may be adapted to generate prediction pixels utilizing motion vector information received from the symbol interpreter 405. For example, the motion compensation block 413 may generate prediction pixels for temporally predicted macroblocks, which may be associated with motion compensation vectors in frames/fields neighboring a current frame/field. The motion compensation block 413 may acquire previous and/or subsequent frames/fields from the frame buffer 419 and utilize the acquired previous and/or subsequent frames/fields for predicting temporally encoded pixels within a current macroblock.

The motion compensation block 413 may comprise a plurality of motion compensation assist blocks that may be utilized to generate the prediction pixels depending on the method utilized to encode the raw elementary stream data 424. For example, the motion compensation block 413 may comprise a range remap block 447, an intensity compensation block 449, an interpolation block 451, a variable block sizing module 453, and bi-directional prediction block 455. The interpolation block 451 may be adapted to interpolate one or more prediction pixels within a current frame utilizing motion vector information received from the symbol interpreter 405, as well as one or more reference frames that are temporally adjacent to the current frame.

If prediction pixels are interpolated utilizing only one reference frame, the interpolation block 451 may be utilized to generate the prediction pixels. However, if more than one prediction reference frames are utilized during temporal prediction of a current pixel, the bi-directional prediction block 455 may be utilized by the motion compensation block 413 to generate the prediction pixels. For example, if several reference frames are utilized for prediction of a current pixel, the bi-directional prediction block 455 may determine the current prediction pixel as an average of the prediction pixels in the reference frames.

The range remap block 447 may be utilized by the motion compensation block 413 during decoding of a VC-1 encoded raw elementary stream. More specifically, the range remap block 447 may be utilized to remap the dynamic range of a reference frame prior to interpolation by the interpolation block 451. The intensity compensation block 449 may be utilized by the motion compensation block 413 to adjust the intensity level of a reference frame to the intensity level of a current frame prior to interpolation by the interpolation block 451.

The variable block sizing module 453 may be utilized by the motion compensation block 413 to control utilization of reference frames acquired from the frame buffer 419. For example, the variable block sizing module 453 may fetch a 16×16, 16×8 and/or 4×4 pixel size macroblock from the frame buffer 419 for use during temporal prediction of pixels within a current macroblock. Other macroblock and/or frame sizes may also be supported by the frame buffer 419, as may be required during motion compensation prediction within the motion compensation block 413.

The IQT block 411 comprises suitable circuitry, logic and/or code and may be adapted to transform quantized frequency coefficients received from the symbol interpreter 405 into one or more prediction errors. More specifically, the IQT block 411 may be adapted to utilize the inverse quantization block 443 and the inverse transformation block 445 to transform the quantized frequency coefficients back to spatial domain, thus generating prediction error information. The prediction error information generated by the IQT block 411 may then be communicated to the reconstructor 415 for further processing during reconstruction of a macroblock.

The inverse zigzag block 439 may be utilized by the IQT block 411 to rearrange the quantized frequency coefficients received from the symbol interpreter 405 prior to inverse transformation by the inverse transformation block 445. Quantized frequency coefficients generated by the symbol interpreter 405 may have been arranged in a zigzag scan order to facilitate encoding. Accordingly, the inverse zigzag block 439 may utilize one or more look-up tables to arrange the quantized frequency coefficients in sequential order, for example.

Depending on the encoding method of the raw elementary stream 424, the IQT block 411 may utilize an AC/DC prediction block 441 during decoding of the prediction error information. For example, quantized frequency coefficients may be encoded within the raw elementary stream 424 utilizing prediction residuals and prediction errors from neighboring pixels. Further, DC prediction within the AC/DC prediction block 441 may correspond to zero frequency coefficients utilized for generating prediction error information. AC prediction within the AC/DC prediction block 441 may correspond to low frequency coefficients utilized for generating prediction error information. Additional information on the operation of a symbol interpreter, motion compensation block, spatial prediction block and inverse quantization and transformation block is more fully disclosed in U.S. patent application Ser. No. 10/963,677 filed Oct. 13, 2004, which is incorporated herein by reference in its entirety.

The reconstructor 415 may be adapted to acquire spatial prediction pixels or temporal prediction pixels from the spatial prediction block 409 or the motion compensation block 413, respectively. In addition, the reconstructor 415 may be adapted to acquire prediction error information generated by the IQT block 411. The reconstructor 415 may then reconstruct a current macroblock utilizing prediction pixels and prediction error information. The reconstructed macroblock may be communicated to the in-loop filter 417 for further processing.

The in-loop filter 417 comprises suitable circuitry, logic and/or code and may be adapted to further filter a decoded/reconstructed macroblock that may be acquired from the reconstructor 415. Depending on the encoding method of the raw elementary stream 424, the in-loop filter 417 may comprise an overlapped transformation block 457 and a deblocking module 459. The overlapped transformation block 457 may be utilized during filtering of a macroblock generated from a VC-1 encoded raw elementary stream 424. More specifically the overlapped transformation block 457 may apply an overlapped transformation to a reconstructed macroblock in order to reduce edge artifacts along one or more edges of the reconstructed macroblock. Similarly, the deblocking module 459 may also be utilized by the in-loop filter 417 to reduce edge artifacts and transform blockiness effects along one or more edges of a reconstructed macroblock. Additional information on deblocking and deblocking memory utilization within a decoder is more fully disclosed in U.S. patent application Ser. No. 10/965,172 filed Oct. 13, 2004 and U.S. patent application Ser. No. 10/972,931 filed Oct. 25, 2004, which are incorporated herein by reference in their entirety.

After a reconstructed macroblock is filtered by the in-loop filter 417, additional post-processing may be performed by the post-processing block 421. Depending on the encoding method of the raw elementary stream 424, the post-processing block may utilize one or more of the following post-processing assist blocks: a range remapping block 461, a resizing block 463, a deblocking module 465 and/or a deringing block 467. The range remapping block 461 may be utilized by the post-processing block 421 if during a VC-1 encoding process, the dynamic range of a macroblock, or a series of macroblocks, was changed. In this manner, all decoded macroblocks 469 that are communicated to a display postprocessor are characterized by the same dynamic range.

The resizing block 463 may be utilized by the post-processing block 421 to rescale/resize a macroblock that may have been upscaled or downscaled during encoding. By utilizing the resizing block 463, the post-processing block 421 may generate decoded macroblocks 469 with the same resolution. The deringing block 467 may be utilized to attenuate "mosquito noise" within a reconstructed macroblock that may have been generated by overly quantized AC coefficients. The deblocking module 465 is similar to the deblocking module 459 within the in-loop filter 417, and may be utilized to further reduce edge artifacts and transform blockiness effects along one or more edges of a reconstructed macroblock prior to communication of the macroblock to a display post-processor, for example.

Figure 4B:
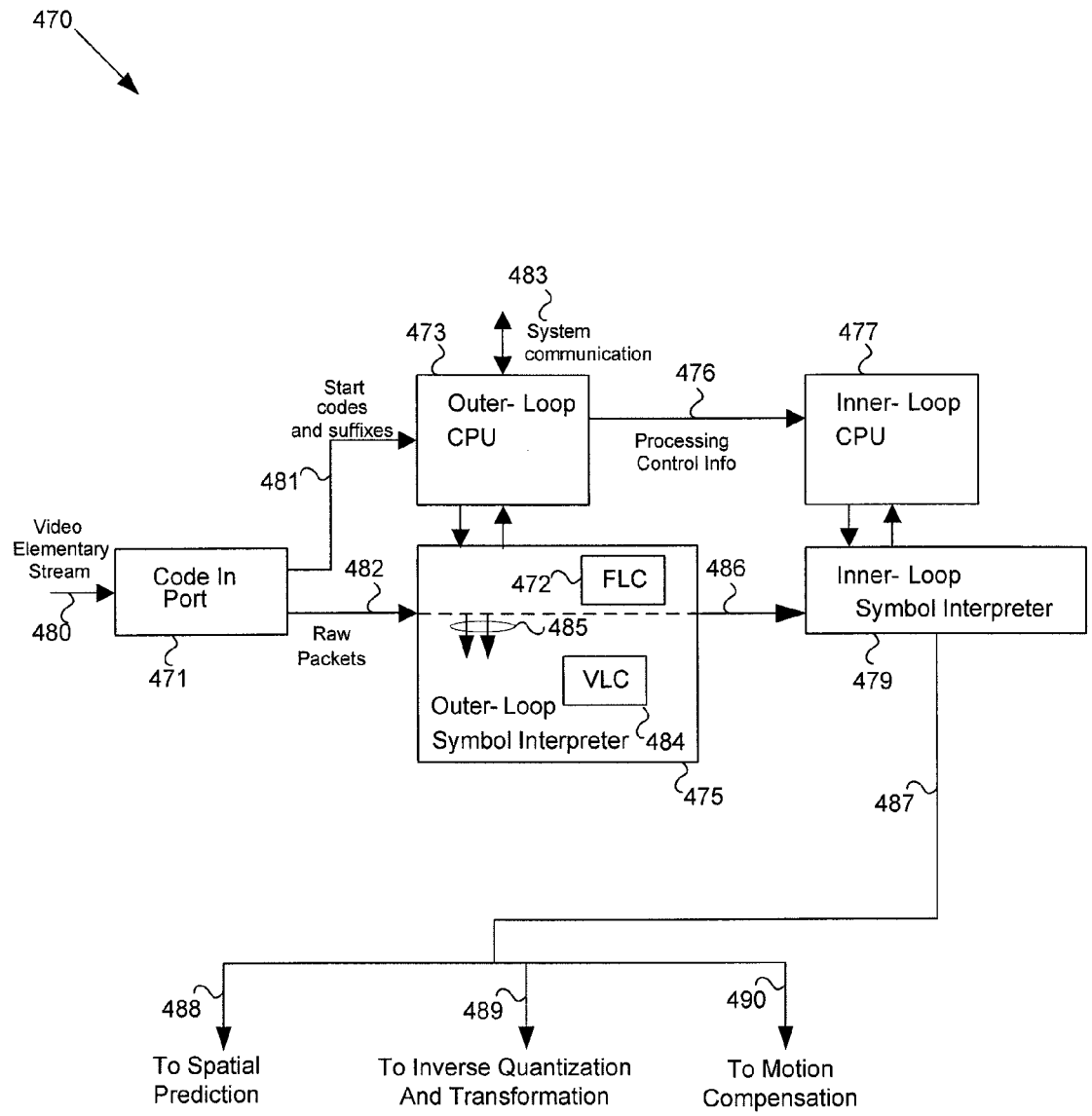
FIG. 4B is a block diagram illustrating a multistandard video decoder with hardware assist blocks and a CPU pair, in accordance with an embodiment of the invention.

FIG. 4B is a block diagram illustrating a multistandard video decoder with hardware assist blocks and a CPU pair, in accordance with an embodiment of the invention. Referring to FIG. 4B, the multistandard video decoder 470 may comprise a code in port (CIP) 471, an outer loop CPU (OLCPU) 473, an outer loop symbol interpreter (OLSI) 475, an inner loop CPU (ILCPU) 477, and an inner loop symbol interpreter (ILCPU) 479. The multistandard video decoder 470 may also comprise a spatial prediction block, an inverse quantization and transformation block, a motion compensation block, a reconstruction block, an in-loop filtering block, frame buffers block, and/or a post-processing block (not pictured in FIG. 4B), as illustrated and described in detail with regard to the multistandard video decoder 400 in FIG. 4A.

In an exemplary embodiment of the invention, the multistandard decoder 470 may utilize the OLCPU 473 and OLSI 475 to process header information from the video elementary bitstream 480. The ILCPU 477 and ILSI 479 may be utilized to process macroblock information from the video elementary bitstream 480. In this manner, parallel processing may be achieved within the multistandard video decoder 470 as OLCPU 473 and OLSI 475 may be processing future header information while ILCPU 477 and ILSI 479 may be processing current macroblock information. Header information from the elementary bitstream 480 may comprise slice information, picture information, GOP/entry point information, and/or sequence information, for example.

In operation, the CIP 471 may receive video elementary code stream 480 and generate start codes and start code suffixes 481 and raw elementary stream 482. The start codes and start code suffixes 481 may be communicated for processing to the OL CPU 473 and the raw packets information 482 may be communicated for processing to the OLSI 475. The OLCPU 473 and the OLSI 475 may be adapted to process only header information from the start codes and start code suffixes 481 and the raw elementary stream 482. The OLCPU 473 may interface with an off-chip video processing system, for example, via the system communications port 483.

The OLSI 475 may comprise a variable length coding (VLC) block 484 and a fixed length coding (FLC) block 472. The VLC block 484 and the FLC block 472 may be utilized to decode header information from the raw packets information 482 received from the CIP 471. For example, header information 485 may be extracted from the raw packets information 482, thus generating an output bitstream 486. The output bitstream 486 may comprise macroblock-related information and may be communicated to the ILSI 479 for further processing. After OLCPU 473 processes header information from the start codes and start code suffixes information 481, the resulting processing control information 476 may be communicated for further processing to the ILCPU 477. The processing control information 476 may comprise control information corresponding to packets containing macroblock information, such as packets in the output bitstream 486.

The ILCPU 477 and the ILSI 479 may be adapted to simultaneously process macroblock-related information for a current macroblock while the OLCPU 473 and the OLSI 475 may be processing subsequent header information. The ILSI 479, similarly to the symbol interpreter 405 in FIG. 4A, may be adapted to generate an output signal 487. The output signal 487 may comprise acquired macroblock type information, slice type information, prediction mode information, motion vector information, and/or quantized frequency coefficients, for example. The acquired macroblock type information, slice type information and/or prediction mode information 488 may be communicated to a spatial prediction block (not pictured), such as the spatial prediction block 409 in FIG. 4A, for further processing and generation of prediction pixels for spatially predicted macroblocks.

The motion vector information 490 may be communicated to a motion compensation block (not pictured), such as the motion compensation block 413 in FIG. 4A, for further processing and generation of prediction pixels for temporally predicted macroblocks. The quantized frequency coefficients 489 may be communicated to an inverse quantization and transformation block (not pictured), such as the inverse quantization and transformation block 411 in FIG. 4A, for further processing and generation of prediction errors utilized during macroblock decoding.

Figure 5:
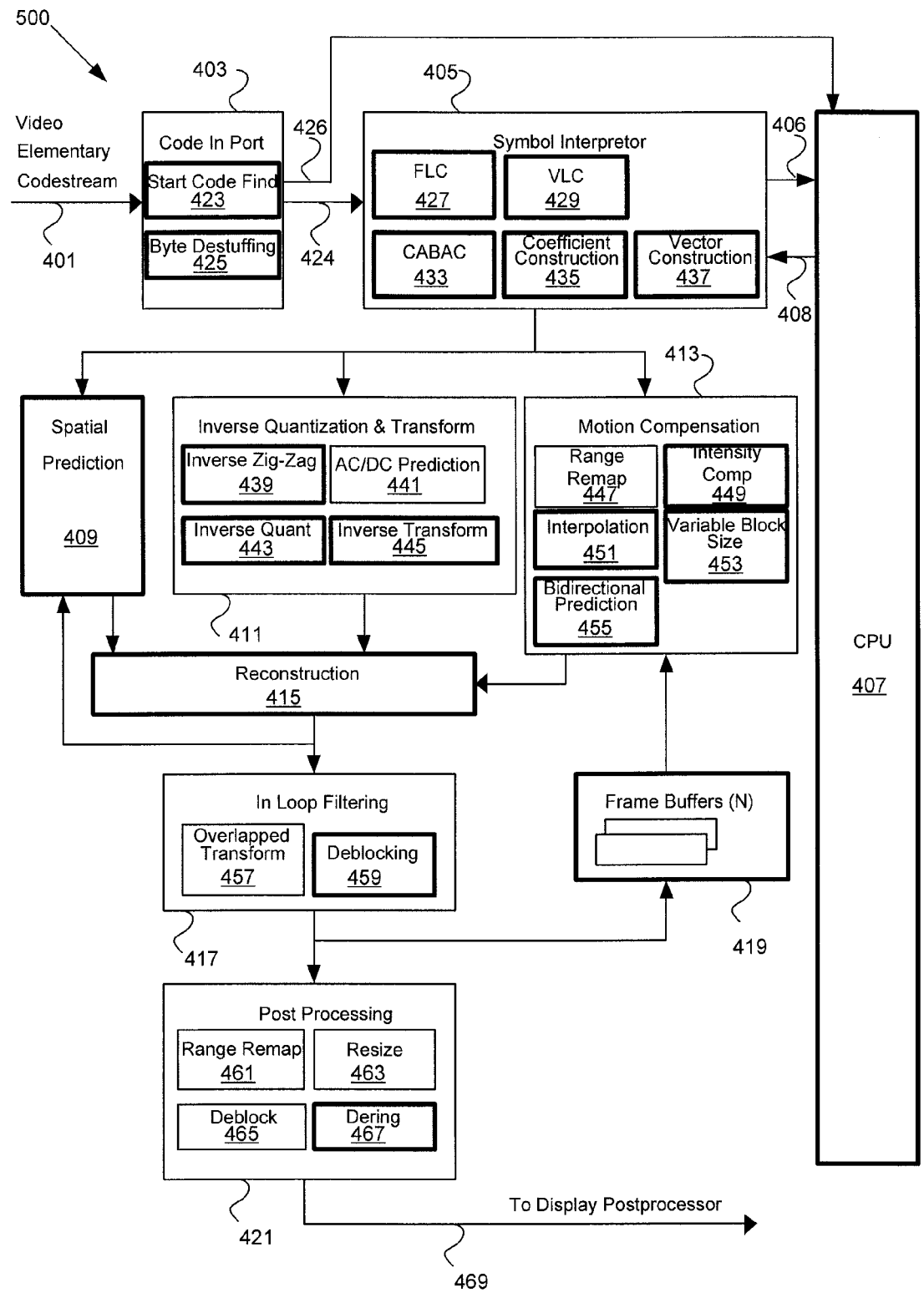
FIG. 5 is a block diagram illustrating operation of the multistandard video decoder of FIG. 4 when decoding H.264 video data, in accordance with an embodiment of the invention.

FIG. 5 is a block diagram illustrating operation of the multistandard video decoder 500 of FIG. 4 when decoding H.264 video data, in accordance with an embodiment of the invention. Referring to FIG. 5, the multistandard video decoder 500 may be adapted to process video elementary codestream 401 that was encoded utilizing H.264 encoding techniques. The CIP 403 may utilize the start code finding block 423 to locate start codes and start code suffixes, as well as the byte destuffing block 425 to remove extra bytes from the H.264 encoded video elementary codestream 401.

The symbol interpreter 405 may be adapted to interpret the H.264 raw elementary stream 424 acquired from the CIP 403 to obtain quantized frequency coefficients information and/or additional side information, such as macroblock type information, slice type information, prediction mode information, and/or motion vectors information, necessary for decoding of the H.264 raw elementary video stream 424. During generation of the quantized frequency coefficients and/or the side information, the symbol interpreter 405 may receive instructions by the CPU 407 and provide subsequent symbol information to the CPU 407. In addition, the symbol interpreter may utilize one or more of the following assist blocks: the FLC block 427, the VLC block 429, the CABAC block 433, the coefficient construction block 435, and/or the vector construction block 437.

Inverse quantized frequency coefficients may be communicated from the symbol interpreter block 405 to the IQT block 411, which may generate prediction error information. The IQT block 411 may utilize the inverse zigzag block 439, the inverse quantization block 443 and/or the inverse transformation block 445 to generate the prediction error information. Side information from the symbol interpreter 405 may be communicated to either the spatial prediction block 409 or the motion compensation block 413 to generate prediction pixels. The motion compensation block 413 may utilize the frame buffer 419 together with the intensity compensation block 449, the interpolation block 451, the variable block sizing module 453 and/or the bi-directional prediction module 455 to generate temporally predicted pixels.

The reconstructor 415 may then be utilized by the multistandard decoder 500 to reconstruct a current macroblock utilizing prediction pixel information acquired from either the spatial prediction block 409 or the motion compensation block 413, respectively, as well as prediction error information acquired from the IQT block 411. A reconstructed macroblock may be filtered by the in-loop filter 417, utilizing the deblocking module 459. The filtered macroblock may be further processed by the post-processing block 421. The post-processing block 421 may utilize the deringing block 467 to generate the decoded macroblock 469. The decoded macroblock 469 may then be communicated to a display post-processor, for example.

Figure 6:
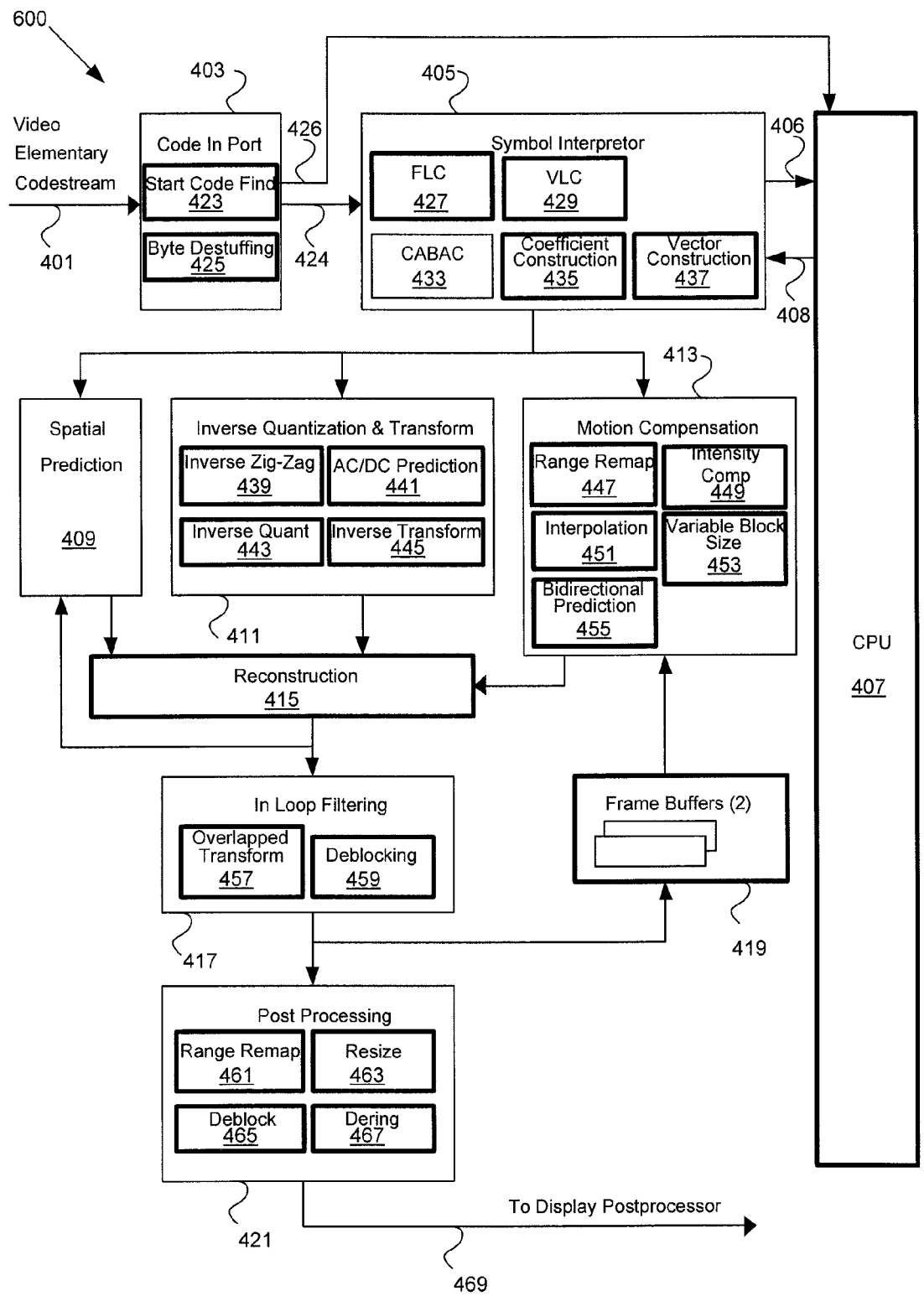
FIG. 6 is a block diagram illustrating operation of the multistandard video decoder of FIG. 4 when decoding VC-1 video data, in accordance with an embodiment of the invention.

FIG. 6 is a block diagram illustrating operation of the multistandard video decoder 600 of FIG. 4 when decoding VC-1 video data, in accordance with an embodiment of the invention. Referring to FIG. 6, the multistandard video decoder 600 may be adapted to process video elementary codestream 401 that was encoded utilizing VC-1 encoding techniques. The CIP 403 may utilize the start code finding block 423 to locate start codes and start code suffixes, as well as the byte destuffing block 425 to remove extra bytes from the VC-1 encoded video elementary codestream 401.

The symbol interpreter 405 may be adapted to interpret the VC-1 raw elementary stream 424 acquired from the CIP 403 to obtain quantized frequency coefficients information and/or additional side information, such as macroblock type information, slice type information, prediction mode information, and/or motion vectors information, necessary for decoding the VC-1 raw elementary video stream 424. During generation of the quantized frequency coefficients and/or the side information, the symbol interpreter 405 may receive instructions by the CPU 407 and provide subsequent symbol information to the CPU 407. In addition, the symbol interpreter may utilize one or more of the following assist blocks: the FLC block 427, the VLC block 429, the coefficient construction block 435, and/or the vector construction block 437.

Inverse quantized frequency coefficients may be communicated from the symbol interpreter block 405 to the IQT block 411, which may generate prediction error information. The IQT block 411 may utilize the inverse zigzag block 439, the AC/DC prediction block 441, the inverse quantization block 443 and/or the inverse transformation block 445 to generate the prediction error information. Side information from the symbol interpreter 405 may be communicated to the motion compensation block 413 to generate prediction pixels. The motion compensation block 413 may utilize the frame buffer 419 together with the intensity compensation block 449, the range remapping block 447, the interpolation block 451, the variable block sizing module 453 and/or the bi-directional prediction module 455 to generate temporally predicted pixels. The frame buffer 419 may be adapted to store and provide at least two reference frames/pictures to the motion compensation block 413.

The reconstructor 415 may then be utilized by the multistandard decoder 600 to reconstruct a current macroblock utilizing prediction pixel information acquired from the motion compensation block 413, as well as prediction error information acquired from the IQT block 411. A reconstructed macroblock may be filtered by the in-loop filter 417, utilizing the deblocking module 459 and/or the overlapped transformation block 457. The filtered macroblock may be further processed by the post-processing block 421. The post-processing block 421 may utilize the deringing block 467, the range remapping block 461, the resizing block 463, and/or the deblocking module 465 to generate the decoded macroblock 469. The decoded macroblock 469 may then be communicated to a display post-processor, for example.

Figure 7:
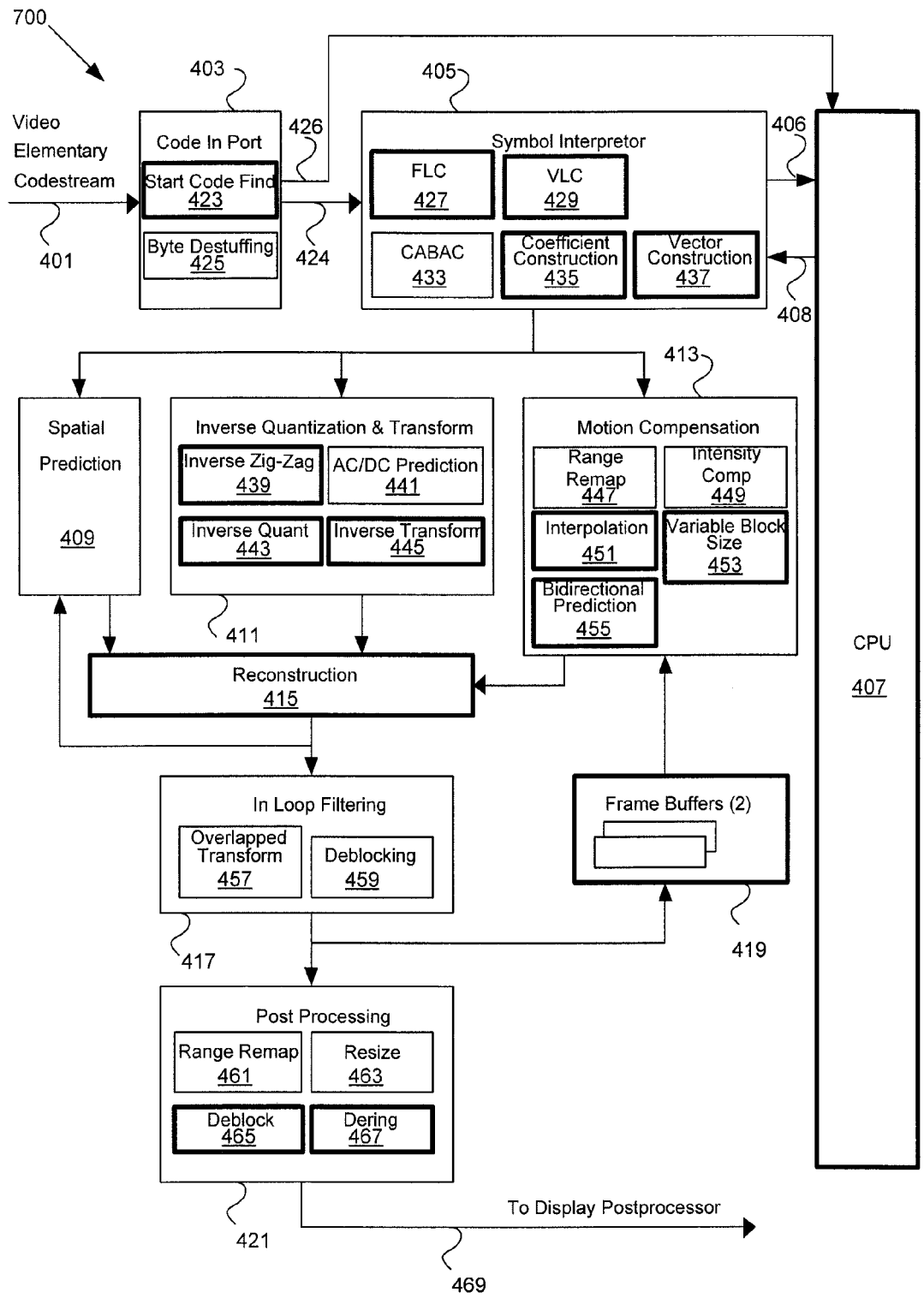
FIG. 7 is a block diagram illustrating operation of the multistandard video decoder of FIG. 4 when decoding MPEG-1 or MPEG-2 video data, in accordance with an embodiment of the invention.

FIG. 7 is a block diagram illustrating operation of the multistandard video decoder 700 of FIG. 4 when decoding MPEG-1 or MPEG-2 video data, in accordance with an embodiment of the invention. Referring to FIG. 7, the multistandard video decoder 700 may be adapted to process video elementary codestream 401 that was encoded utilizing MPEG-1 or MPEG-2 encoding techniques. The CIP 403 may utilize the start code finding block 423 to locate start codes and start code suffixes within the MPEG-1/MPEG-2 encoded video elementary codestream 401.

The symbol interpreter 405 may be adapted to interpret the MPEG-1/MPEG-2 raw elementary stream 424 acquired from the CIP 403 to obtain quantized frequency coefficients information and/or additional side information, such as macroblock type information, slice type information, prediction mode information, and/or motion vectors information, necessary for decoding of the MPEG-1/MPEG-2 raw elementary video stream 424. During generation of the quantized frequency coefficients and/or the side information, the symbol interpreter 405 may receive instructions by the CPU 407 and provide subsequent symbol information to the CPU 407. In addition, the symbol interpreter may utilize one or more of the following assist blocks: the FLC block 427, the VLC block 429, the coefficient construction block 435, and/or the vector construction block 437.

Inverse quantized frequency coefficients may be communicated from the symbol interpreter block 405 to the IQT block 411, which may generate prediction error information. The IQT block 411 may utilize the inverse zigzag block 439, the inverse quantization block 443 and/or the inverse transformation block 445 to generate the prediction error information. Side information from the symbol interpreter 405 may be communicated to the motion compensation block 413 to generate prediction pixels. The motion compensation block 413 may utilize the frame buffer 419 together with the interpolation block 451, the variable block sizing module 453 and/or the bi-directional prediction module 455 to generate temporally predicted pixels. The frame buffer 419 may be adapted to store and provide at least two reference frames/pictures to the motion compensation block 413.

The reconstructor 415 may then be utilized by the multistandard decoder 700 to reconstruct a current macroblock utilizing prediction pixel information acquired from the motion compensation block 413, as well as prediction error information acquired from the IQT block 411. A reconstructed macroblock may be further processed by the post-processing block 421. The post-processing block 421 may utilize the deringing block 467 and/or the deblocking module 465 to generate the decoded macroblock 469. The decoded macroblock 469 may then be communicated to a display post-processor, for example.

Figure 8:
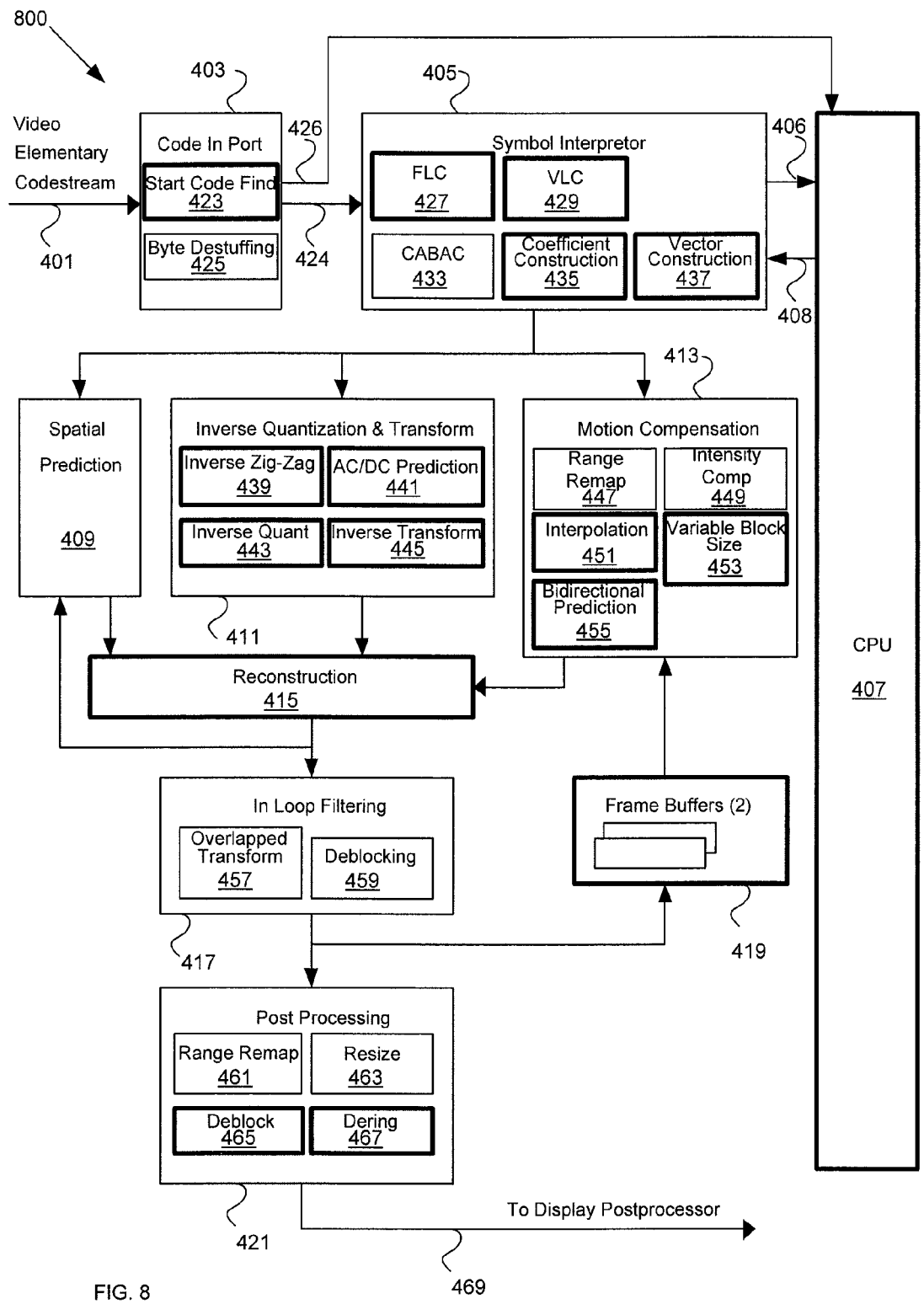
FIG. 8 is a block diagram illustrating operation of the multistandard video decoder of FIG. 4 when decoding MPEG-4 video data, in accordance with an embodiment of the invention.

FIG. 8 is a block diagram illustrating operation of the multistandard video decoder 800 of FIG. 4 when decoding MPEG-4 video data, in accordance with an embodiment of the invention. Referring to FIG. 8, the multistandard video decoder 800 may be adapted to process video elementary codestream 401 that was encoded utilizing MPEG-4 encoding techniques. The CIP 403 may utilize the start code finding block 423 to locate start codes and start code suffixes within the MPEG-4 encoded video elementary codestream 401.

The symbol interpreter 405 may be adapted to interpret the MPEG-4 raw elementary stream 424 acquired from the CIP 403 to obtain quantized frequency coefficients information and/or additional side information, such as macroblock type information, slice type information, prediction mode information, and/or motion vectors information, necessary for decoding of the MPEG-4 raw elementary video stream 424. During generation of the quantized frequency coefficients and/or the side information, the symbol interpreter 405 may receive instructions by the CPU 407 and provide subsequent symbol information to the CPU 407. In addition, the symbol interpreter may utilize one or more of the following assist blocks: the FLC block 427, the VLC block 429, the coefficient construction block 435, and/or the vector construction block 437.

Inverse quantized frequency coefficients may be communicated from the symbol interpreter block 405 to the IQT block 411, which may generate prediction error information. The IQT block 411 may utilize the inverse zigzag block 439, the AC/DC prediction block 441, the inverse quantization block 443 and/or the inverse transformation block 445 to generate the prediction error information. Side information from the symbol interpreter 405 may be communicated to the motion compensation block 413 to generate prediction pixels.

The motion compensation block 413 may utilize the frame buffer 419 together with the interpolation block 451, the variable block sizing module 453 and/or the bi-directional prediction module 455 to generate temporally predicted pixels. The frame buffer 419 may be adapted to store and provide at least two reference frames/pictures to the motion compensation block 413.

The reconstructor 415 may then be utilized by the multistandard decoder 700 to reconstruct a current macroblock utilizing prediction pixel information acquired from the motion compensation block 413, as well as prediction error information acquired from the IQT block 411. A reconstructed macroblock may be further processed by the post-processing block 421. The post-processing block 421 may utilize the deringing block 467 and/or the deblocking module 465 to generate the decoded macroblock 469. The decoded macroblock 469 may then be communicated to a display post-processor, for example.

Figure 9:
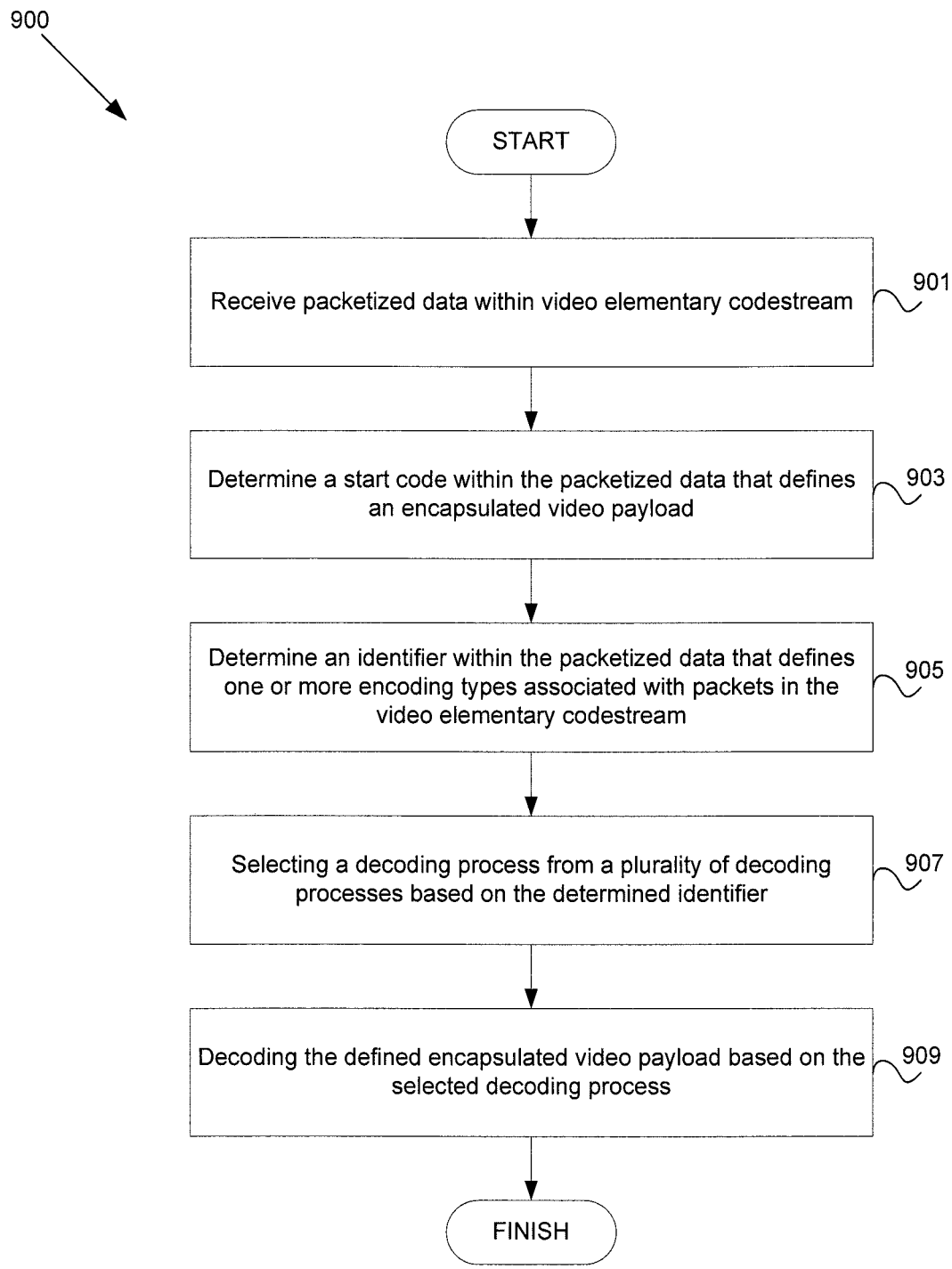
FIG. 9 is a flow diagram of an exemplary method for processing an encoded video stream, in accordance with an embodiment of the invention.

FIG. 9 is a flow diagram of an exemplary method 900 for processing an encoded video stream, in accordance with an embodiment of the invention. Referring to FIG. 9, at 901, packetized data may be received within video elementary code stream, where the video elementary codestream may be encoded according to one of a plurality of encoding methods. At 903, a start code may be determined within the packetized data, where the start code may define an encapsulated video payload. At 905, an identifier may be determined within the packetized data that defines one or more encoding types associated with packets in the video elementary codestream. At 907, a decoding process may be selected from a plurality of decoding processes based on the determined identifier. At 909, the defined encapsulated video payload may be decoded based on the selected decoding process.

Accordingly, aspects of the invention may be realized in hardware, software, firmware or a combination thereof. The invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

The invention claimed is:

1. A method for processing video, the method comprising:
performing by one or more processors and/or circuits:
receiving packetized data within an encoded video stream;
determining a start code within said received packetized data, wherein the start code separates packets within said encoded video stream;
determining an identifier within said received packetized data that defines one of a plurality of encoding types associated with packets in the encoded video stream, the identifier being different than the start code;
selecting a decoding process from a plurality of decoding processes in response to said determined identifier, wherein said plurality of decoding processes comprises a fixed length coding (FLC) process, a variable length coding (VLC) process and a context adaptive binary arithmetic coding (CABAC) process; and
decoding at least a portion of said received packetized data in the encoded video stream utilizing said selected decoding process.

2. The method according to claim 1, comprising matching a plurality of bytes within said received packetized data with a determined byte sequence based on said determined start code.

3. The method according to claim 2, comprising removing said plurality of bytes from said received packetized data, when said plurality of bytes matches said determined byte sequence.

4. The method according to claim 1, comprising decoding said at least a portion of said received packetized data utilizing one or more of said fixed length coding (FLC) process, said variable length coding (VLC) process and said context adaptive binary arithmetic coding (CABAC) process, when said determined identifier corresponds to H.264 video encoding.

5. The method according to claim 1, comprising decoding said at least a portion of said received packetized data utilizing one or both of said FLC process and said VLC process, when said determined identifier corresponds to VC-1 video encoding.

6. The method according to claim 1, comprising decoding said at least a portion of said received packetized data utilizing one or both of said FLC process and said VLC process, when said determined identifier corresponds to one or more of an H.261, H.263, H.263+, MPEG-1, MPEG-2 and/or MPEG-4 video encoding.

7. The method according to claim 1, wherein said decoded packetized data comprises both prediction pixels information and prediction error information.

8. A non-transitory computer-readable storage having stored thereon, a computer program having at least one code section for processing video, the at least one code section being executable by a machine to perform steps comprising:
performing by one or more processors and/or circuits:
receiving packetized data within an encoded video stream;
determining a start code within said received packetized data, wherein the start code defines a start of a payload in said received packetized data;
determining an identifier within said received packetized data that defines one of a plurality of encoding types associated with packets in the encoded video stream;
selecting a decoding process from a plurality of decoding processes based on said determined identifier, wherein said plurality of decoding processes comprises a fixed length coding (FLC) process, a variable length coding (VLC) process and a context adaptive binary arithmetic coding (CABAC) process;
removing a stuffing byte from said start code in the packetized data; and
decoding, at least a portion of said received packetized data in the encoded video stream utilizing said selected decoding process.

9. The computer-readable storage according to claim 8, wherein said start code within said received packetized data separates packets within said encoded video stream.

10. The computer-readable storage according to claim 9, comprising code for matching a plurality of bytes within said received packetized data with a determined byte sequence based on said determined start code.

11. The computer-readable storage according to claim 10, comprising code for removing said plurality of bytes from said received packetized data, when said plurality of bytes matches said determined byte sequence.

12. The computer-readable storage according to claim 8, comprising code for decoding said at least a portion of said received packetized data utilizing one or both of said FLC process and said VLC process, when said determined identifier corresponds to VC-1 video encoding.

13. The computer-readable storage according to claim 8, comprising code for decoding said at least a portion of said received packetized data utilizing one or both of said FLC process and said VLC process, when said determined identifier corresponds to one or more of an H.261, H.263, H.263+, MPEG-1, MPEG-2 and MPEG-4 video encoding.

14. The computer-readable storage according to claim 8, comprising code for generating a decoded video stream utilizing at least a portion of said decoded packetized data.

15. The computer-readable storage according to claim 8, comprising, for each of said plurality of decoding processes, code for decoding said at least a portion of said received packetized data utilizing one or more of inverse transformation, inverse quantization, and motion compensation.

16. A system for processing video, the system comprising:
one or more processors or circuits that are operable to:
receive packetized data within an encoded video stream;
determine a start code within said received packetized data, the start code indicative of a start of a payload in said received packetized data;
determine an identifier within said received packetized data that defines one of a plurality of encoding types associated with packets in the encoded video stream;
select a decoding process from a plurality of decoding processes based on said determined identifier, wherein said plurality of decoding processes comprises a fixed length coding (FLC) process, a variable length coding (VLC) process and a context adaptive binary arithmetic coding (CABAC) process;

the one or more processors or circuits comprising a code-in-port, the code-in-port operable to:
locate said start code and a start code suffix,
destuff the start code, and
generate a raw elementary video stream; and
decode at least a portion of said received packetized data in the encoded video stream utilizing said selected decoding process.

17. The system according to claim 16, wherein said start code within said received packetized data separates packets within said encoded video stream.

18. The system according to claim 16, wherein said one or more processors or circuits are operable to match a plurality of bytes within said received packetized data with a determined byte sequence based on said determined start code.

19. The system according to claim 18, wherein said one or more processors or circuits are operable to remove said plurality of bytes from said received packetized data, when said plurality of bytes matches said determined byte sequence.

20. The system according to claim 16, wherein said one or more processors or circuits are operable to decode said at least a portion of said received packetized data utilizing one or more of said fixed length coding (FLC) process, said variable length coding (VLC) process and said context adaptive binary arithmetic coding (CABAC) process, when said determined identifier corresponds to H.264 video encoding.

21. The system according to claim 16, wherein said one or more processors or circuits are operable to decode said at least a portion of said received packetized data utilizing one or both of said FLC process and said VLC process, when said determined identifier corresponds to VC-1 video encoding.

22. The system according to claim 16, wherein said one or more processors or circuits are operable to decode said at least a portion of said received packetized data utilizing one or both of said FLC process and said VLC process, when said determined identifier corresponds to one or more of an H.261, H.263, H.263+, MPEG-1, MPEG-2 and MPEG-4 video encoding.

23. The system according to claim 16, wherein said decoded packetized data comprises both prediction pixels information and prediction error information.

24. The system according to claim 16, wherein said one or more processors or circuits are operable to generate a decoded video stream utilizing at least a portion of said decoded packetized data.

25. A method for processing video, the method comprising:
performing by more than one processors, wherein said more than one processors are operable to utilize a plurality of decoding processes that are each specified by a corresponding one of a plurality of encoding types, said plurality of decoding processes comprising a fixed length coding (FLC) process, a variable length coding (VLC) process and a context adaptive binary arithmetic coding (CABAC) process:
receiving one or more packets of an encoded video stream, and identifying a start code and an identifier within one or more packets of said encoded video stream, wherein said start code indicates start of a payload in said one or more packets and said identifier indicates encoding type of said payload in said one or more packets;
selecting one or more of said plurality of decoding processes for decoding said encoded video stream based on a corresponding one or more of said plurality of encoding types that is specified by said identifier within said one or more packets of said encoded video stream; and
decoding said packetized data within said encoded video stream utilizing said selected one or more of said plurality of decoding processes.

26. The method according to claim 25, comprising matching a plurality of bytes within said packetized data with a determined byte sequence based on said determined start code.

27. The method according to claim 26, comprising removing said matched plurality of bytes from said packetized data, when said plurality of bytes matches said determined byte sequence.

28. The method according to claim 25, comprising decoding at least a portion of said packetized data utilizing one or more of said fixed length coding (FLC) process, said variable length coding (VLC) process and said context adaptive binary arithmetic coding (CABAC) process, when said one or more of said plurality of encoding types comprises H.264 video encoding.

29. The method according to claim 25, comprising decoding at least a portion of said packetized data utilizing one or both of said FLC process and said VLC process, when said one or more of said plurality of encoding types comprises VC-1 video encoding.

30. The method according to claim 25, comprising decoding at least a portion of said received packetized data utilizing one or both of said FLC process and said VLC process, when said one or more of said plurality of encoding types comprises one or more of an H.261, H.263, H.263+, MPEG-1, MPEG-2 and MPEG-4 video encoding.

31. The method according to claim 25, wherein said decoded packetized data comprises both prediction pixels information and prediction error information.

32. The method according to claim 25, comprising, for each of said plurality of decoding processes, decoding at least a portion of said packetized data utilizing one or more of inverse transformation, inverse quantization, and motion compensation.

33. A non-transitory computer-readable storage having stored thereon, a computer program having at least one code section for processing video, the at least one code section being executable by a machine to perform steps comprising:
performing by more than one processors, wherein said more than one processors are operable to utilize a plurality of decoding processes that are each specified by a corresponding one of a plurality of encoding types, said plurality of decoding processes comprising a fixed length coding (FLC) process, a variable length coding (VLC) process and a context adaptive binary arithmetic coding (CABAC) process:
selecting one or more of said plurality of decoding processes for decoding an encoded video stream based on a corresponding one or more of said plurality of encoding types that is specified by an identifier within one or more packets of said encoded video stream;
identifying start of a payload within said one or more packets of said encoded video stream based on a start code within said one or more packets, wherein said start code separates packets within said encoded video stream;
removing a stuffing byte from said start code received in the one or more packets of the encoded video stream; and
decoding packetized data within said encoded video stream utilizing said selected one or more of said plurality of decoding processes.

34. The computer-readable storage according to claim 33, comprising code for matching a plurality of bytes within said packetized data with a determined byte sequence based on said determined start code.

35. The computer-readable storage according to claim 34, comprising code for removing said matched plurality of bytes from said packetized data, when said plurality of bytes matches said determined byte sequence.

36. The computer-readable storage according to claim 33, comprising code for decoding at least a portion of said packetized data utilizing one or more of said fixed length coding (FLC) process, said variable length coding (VLC) process and said context adaptive binary arithmetic coding (CABAC) process, when said one or more of said plurality of encoding types comprises H.264 video encoding.

37. The computer-readable storage according to claim 33, comprising code for decoding at least a portion of said packetized data utilizing one or both of said FLC process and said VLC process, when said one or more of said plurality of encoding types comprises VC-1 video encoding.

38. The computer-readable storage according to claim 33, comprising code for decoding at least a portion of said received packetized data utilizing one or both of said FLC process and said VLC process, when said one or more of said plurality of encoding types comprises one or more of an H.261, H.263, H.263+, MPEG-1, MPEG-2 and MPEG-4 video encoding.

39. The computer-readable storage according to claim 33, wherein said decoded packetized data comprises both prediction pixels information and prediction error information.

40. The computer-readable storage according to claim 33, comprising code for generating a decoded video stream utilizing at least a portion of said decoded packetized data.

41. A system for processing video, the system comprising:
more than one processors, wherein said more than one processors is operable to utilize a plurality of decoding processes that are each specified by a corresponding one of a plurality of encoding types, said plurality of decoding processes comprising a fixed length coding (FLC) process, a variable length coding (VLC) process and a context adaptive binary arithmetic coding (CABAC) process, said more than one processors are operable to:
select one or more of said plurality of decoding processes for decoding an encoded video stream based on a corresponding one or more of said plurality of encoding types that is specified by an identifier within one or more packets of said encoded video stream;
identify start of a payload within said one or more packets of said encoded video stream based on a start code within said one or more packets:
destuff said start code within the one or more packets of the encoded video stream;
generate a raw elementary video stream from the one or more packets of said encoded video stream;
deliver the raw elementary video stream to a symbol interpreter of the one or more processor; and
decode packetized data within said encoded video stream utilizing said selected one or more of said plurality of decoding processes.

42. The system according to claim 41, wherein said start code within said packetized data separates packets within said encoded video stream.

43. The system according to claim 42, wherein said more than one processors are operable to match a plurality of bytes within said packetized data with a determined byte sequence based on said determined start code.

44. The system according to claim 43, wherein said more than one processors are operable to remove said matched plurality of bytes from said packetized data, when said plurality of bytes matches said determined byte sequence.

45. The system according to claim 41, wherein said more than one processors are operable to decode at least a portion of said packetized data utilizing one or more of said fixed length coding (FLC) process, said variable length coding (VLC) process and said context adaptive binary arithmetic coding (CABAC) process, when said one or more of said plurality of encoding types comprises H.264 video encoding.

46. The system according to claim 41, wherein said more than one processors are operable to decode at least a portion of said packetized data utilizing one or both of said FLC process and said VLC process, when said one or more of said plurality of encoding types comprises VC-1 video encoding.

47. The system according to claim 41, wherein said more than one processors are operable to decode at least a portion of said received packetized data utilizing one or both of said FLC process and said VLC process, when said one or more of said plurality of encoding types comprises one or more of an H.261, H.263, H.263+, MPEG-1, MPEG-2 and MPEG-4 video encoding.

48. The system according to claim 41, wherein said decoded packetized data comprises both prediction pixels information and prediction error information.

49. The method according to claim 1, further comprising removing a stuffing byte from said start code in the packetized data.

50. The method according to claim 49, further comprising identifying the start code after removing the stuffing byte.

51. The computer-readable storage according to claim 8, further comprising identifying the start code after removing the stuffing byte.

52. The system according to claim 16, wherein, the code-in-port is further operable to deliver the raw elementary video stream to a symbol interpreter of the one or more processor or circuits.

53. The system according to claim 16, wherein, the code-in-port is further operable to deliver a start code suffix to a CPU of the one or more processor or circuits, wherein the start code suffix is the identifier.

54. The method according to claim 25, further comprising removing a stuffing byte from the start code, and identifying the start code after the removing of the stuffing byte.

55. The computer-readable storage according to claim 33, further comprising identifying the start code after removing the stuffing byte.

56. The system according to claim 41, further comprising identifying a start code suffix in the one or more packets of the encoded video stream wherein the start code suffix is the identifier.

57. The method of claim 1, wherein a start code suffix is said identifier.

58. The method of claim 25, wherein said identifier is located after said start code.

59. The method of claim 58, wherein said identifier is a start code suffix.

60. The computer-readable storage according to claim 33, wherein said identifier is located immediately after said start code.

* * * * *